(12) United States Patent
Deering

(10) Patent No.: US 8,323,032 B2
(45) Date of Patent: Dec. 4, 2012

(54) OBSTETRICS SIMULATION AND TRAINING METHOD AND SYSTEM

(75) Inventor: Shad H. Deering, Dupont, WA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/049,497

(22) Filed: Mar. 16, 2011

(65) Prior Publication Data

US 2011/0189641 A1   Aug. 4, 2011

Related U.S. Application Data

(63) Continuation of application No. 12/670,250, filed as application No. PCT/US2008/076725 on Jul. 11, 2008, now Pat. No. 7,997,904.

(60) Provisional application No. 61/080,130, filed on Jul. 11, 2008, provisional application No. 60/960,192, filed on Sep. 19, 2007, provisional application No. 60/960,143, filed on Sep. 17, 2007.

(51) Int. Cl.
   *G09B 23/28* (2006.01)
(52) U.S. Cl. .......................... 434/273; 434/262
(58) Field of Classification Search .......... 434/265–272; 446/268, 283, 284, 295, 298, 320, 330
   See application file for complete search history.

(56) References Cited

U.S. PATENT DOCUMENTS

| | | |
|---|---|---|
| 2005/0014115 A1 | 1/2005 | Reiner et al. |
| 2006/0073456 A1 | 4/2006 | Allen et al. |
| 2007/0105083 A1 | 5/2007 | Riener et al. |
| 2007/0122785 A1 | 5/2007 | Eggert et al. |
| 2008/0138780 A1 | 6/2008 | Eggert et al. |
| 2008/0227073 A1 | 9/2008 | Bardsley et al. |

FOREIGN PATENT DOCUMENTS

| | | |
|---|---|---|
| DE | 102 02 504 Al | 7/2003 |
| FR | 2 877 128 A1 | 4/2006 |
| JP | 61-262781 A | 11/1986 |

OTHER PUBLICATIONS

European Patent Office, 08832510.5-2221 / 2193514 PCT/US2008076725 extended European search report, Nov. 25, 2011.
Deering, Shad A., Additional Training with an Obstetric Simulator Improves Medical Student Comfort with Basic Procedures, Simulation in Healthcare, vol. 1, No. 1, Spring 2006.
Deering, Shad A., Improving Resident Competency in the Management of Shoulder Dystocia With Simulation Training, vol. 103, No. 6, June 2004, The American College of Obstetricians and Gynecologists, Published by Lippincott Williams & Wilkins.
Deering, Shad A., Simulation Training and Resident Performance of Singleton Vaginal Breech Delivery, Simulation in Healthcare, Obstetrics & Gynecology, vol. 107, No. 1, Jan. 2006.

*Primary Examiner* — Timothy A Musselman
(74) *Attorney, Agent, or Firm* — Elizabeth Arwine

(57) ABSTRACT

An embodiment of the invention provides a method wherein a simulation system having a simulator, a processor, and at least one display is assembled. This includes assembling a birthing mannequin and a mobile cart having at least one touch-screen monitor, wherein the birthing mannequin includes a means for shaking to simulate a generalized seizure. The simulation system is provided along with documentation to a plurality of medical facilities within a system. Training on use of the simulator, different simulations, and criteria for grading performance on the simulations is also provided. The training includes team training for conducting the simulations using the simulation system.

20 Claims, 16 Drawing Sheets

Evaluation Forms
VAGINAL BREECH SCORING SHEET

Physician #/Name _____ Date _____
Training Site _____ Grader _____

Training Level: (Circle One)  PGY-1  PGY-2  PGY-3  PGY-4  Staff  Fellow

| | | | |
|---|---|---|---|
| 1. Calls for help  Yes  No | | | |
| 2. Suggests moving to O.R. | | Yes | No |
| 3. Allows breech to deliver to umbilicus with maternal pushing | Yes | No | |
| 4. Episiotomy | | Yes | No |
| 5. Delivery of leg: splint medial thighs, parallel to femur and sweeps laterally | | Yes | No |
| 6. Repeats on opposite leg | | Yes | No |
| 7. Places moist towel on fetal trunk | | Yes | No |
| 8. Fingers on bones and groins | | Yes | No |
| 9. Gentle downward traction with sacrum anterior | | Yes | No |
| 10. 90°-180° rotation to deliver arms | | Yes | No |
| 11. Delivery of arms: sweeping in long axis of bone downward | Yes | No | |
| 12. Rotate and repeat with second arm | | Yes | No |

Piper Forceps

| | | | |
|---|---|---|---|
| 14. Applied after the shoulder and arms have been delivered and the head is in the pelvis with the chin posterior | | Yes | No | N/A |
| 15. Infant held in towel by an assistant. Infant should not be held above the horizontal plane. | | Yes | No | N/A |
| 16. Left blade applied first, infant's body carried toward mother's right side | | Yes | No | N/A |
| 17. Operator assumes a kneeling position, left blade held by left hand with handle below mother's right thigh and beneath the body of infant. Toe of blade guided into the vagina with the operator's right hand. | Yes | No | N/A |
| 18. Handle is swept in an arc downward and towards the midline while the toe of the blade passes into the pelvis along the side of the infant's head to the right ear. | | Yes | No | N/A |
| 19. Right blade similarly introduced. If resistance met, the toe is introduced more posteriorly and wandered along the side of the head. | | Yes | No | N/A |

1. How skilled was the physician in performing the breech vaginal delivery ?

| Not skilled | | Somewhat Skilled | | Skilled | | Moderately Skilled | | Very Skilled | | |
|---|---|---|---|---|---|---|---|---|---|---|
| 0 | 1 | 2 | 3 | 4 | 5 | 6 | 7 | 8 | 9 | 10 |

2. How safely did the physician perform the breech vaginal delivery ?

| Dangerous | | Somewhat Safe | | Adequate Safe | | Moderately | | Very Safe | | |
|---|---|---|---|---|---|---|---|---|---|---|
| 0 | 1 | 2 | 3 | 4 | 5 | 6 | 7 | 8 | 9 | 10 |

STANDARD TEAMSTEPPS DEBRIEFING QUESTIONS FOR MOBILE OBSTETRIC EMERGENCIES SIMULATOR

1  The team oriented new members during the scenario as they arrived. (Background/Assessment/Recommendation)
        A1 = Strongly disagree
        B2
        C3
        D4 = Neither agree nor disagee
        E5
        F6
        G7 = Completely agree 2  The team communicated their thinking well (SHARED MENTAL MODEL).
        A1 = Strongly disagree
        B2
        C3
        D4 = Neither agree nor disagee
        E5
        F6
        G7 = Completely agree 3.  The team utilized CLOSED-LOOP COMMUNICATION during the drill.
        A1 = Strongly disagree
        B2
        C3
        D4 = Neither agree nor disagee
        E5
        F6
        G7 = Completely agree 4.  The team avoided TARGET FIXATION during the simulation (i.e. fetal o signs).
        A1 = Strongly disagree
        B2
        C3
        D4 = Neither agree nor disagee
        E5
        F6
        G7 = Completely agree

FIG. 8

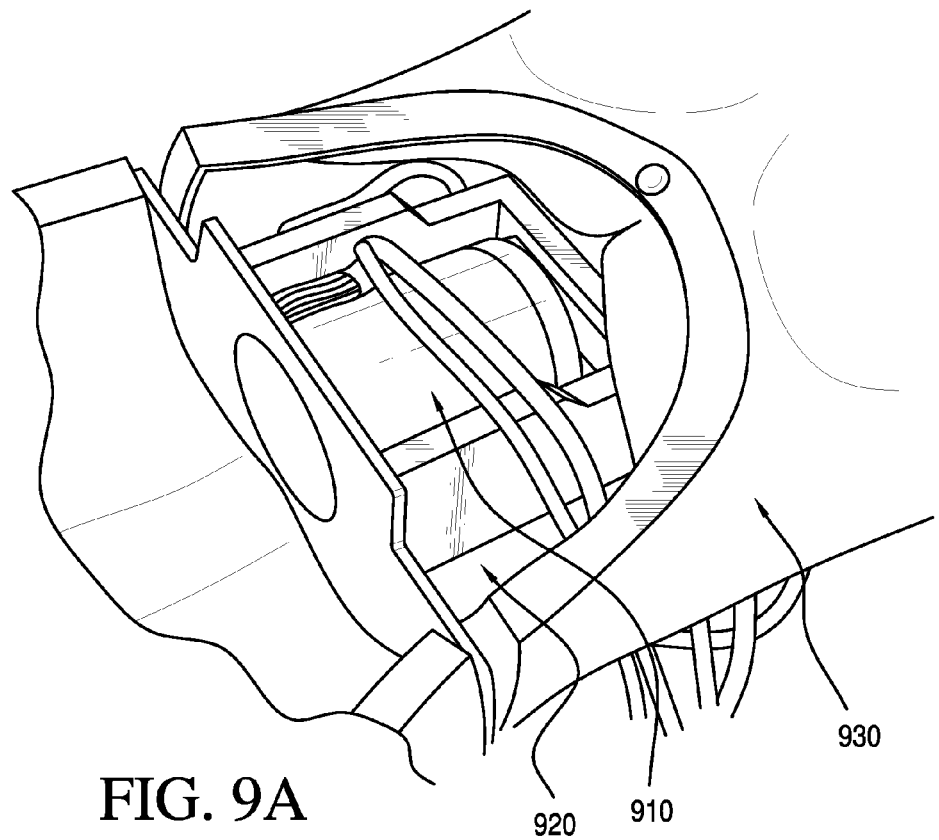
FIG. 9A
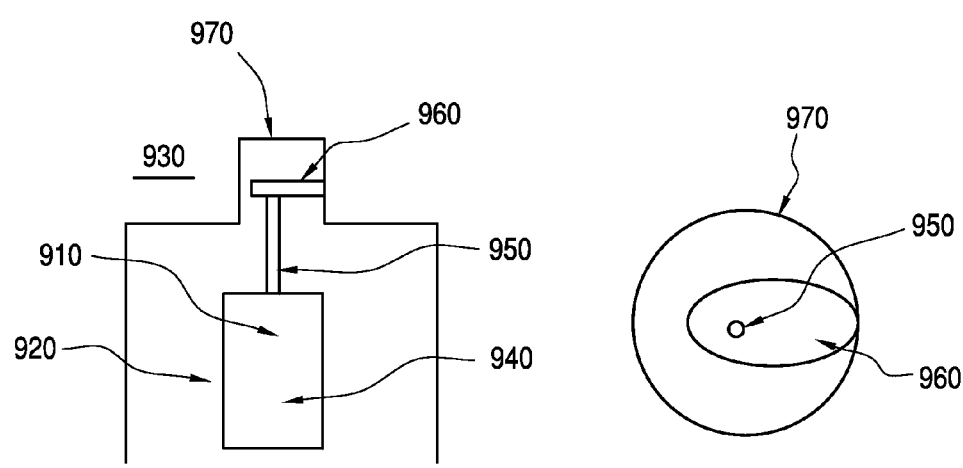
FIG. 9B
FIG. 9C

OBSTETRICS SIMULATION AND TRAINING METHOD AND SYSTEM

This patent application is a continuation application of U.S. patent application Ser. No. 12/670,250 filed on Jan. 22, 2010 (hereby incorporated by reference), which is a U.S. National Stage Application under 35 U.S.C. 371 of PCT Application No. PCT/US2008/076725, filed on Sep. 9, 2008. PCT Application No. PCT/US2008/076725 claims the benefit of U.S. Patent Application No. 61/080,130 filed on Jul. 11, 2008; U.S. Patent Application No. 60/960,192 filed on Sep. 19, 2007; and U.S. Patent Application No. 60/960,143 filed on Sep. 17, 2007.

I. FIELD OF THE INVENTION

An embodiment of the invention is in the field of obstetrics training in a variety of settings from small hospitals (or medical centers) to large medical complexes.

II. BACKGROUND OF THE INVENTION

Because there is no greater emotional and significant event than the birth of a child, physicians ensure that their practice patterns incorporate the most current and stringent evidence-based practices to promote patient safety. A recent report estimated that nearly 40% of all maternal deaths in the United States could be avoided with better obstetric care during emergencies. Berg C J, Harper M A, Atkinson S M, Bell E A, Brown H L, Hage M L, Mitra A G, Moise K J, Callaghan W M, *Preventability of pregnancy-related deaths: Results of a state-wide review*, Obstet Gynecol 2005, 106(6):1228-1234. In addition, obstetrics is the source of the greatest amount of money paid in legal claims across the Department of Defense with payments in the millions every year which are an obvious detriment to the military health care system's reputation with patients and the general public.

III. SUMMARY OF THE INVENTION

An embodiment of the invention provides implemented technology and integration of educational techniques with available resources in a manner that provides better training to a larger group of physicians and medical personnel.

In the modern practice of obstetrics, the military is in the position of having experts in both simulation training for obstetric emergencies and teamwork training. The military has the potential to train better and provide the safest environment possible with these resources.

Accordingly, an embodiment of the invention provides an obstetrics simulation system, comprising an articulating maternal birthing simulator. The maternal birthing simulator is a full size and full-body female having an intubeable airway with a chest rise component, a forearm having a medication receiving component, and/or a fetal heart sound component. Additionally, the maternal birthing simulator includes a head descent and cervical dilation monitor, a placenta positionable in at least two locations, two or more removable dilating cervices, and/or postpartum vulval suturing inserts.

An eclampsia simulation component is provided in a cavity of the maternal birthing simulator, wherein the eclampsia simulation component has a motor, a drive shaft connected to the motor, and a cam connected to the drive shaft. The cam engages and agitates an aperture within the cavity. The center of the cam is offset with respect to a center of the aperture. Specifically, rotation of the drive shaft and the resulting movement of the cam shakes the cavity of the maternal birthing simulator laterally from side-to-side.

At least one processor is provided for receiving input from the maternal birthing simulator, generating feedback based on the input, and sending the feedback to the maternal birthing simulator. The obstetrics simulation system further includes: a medical information (e.g., heart rate, temperature) display connected to the maternal birthing simulator, a video recording and playback system connected to the processor, and/or an audio system connected to the maternal birthing simulator. Moreover, a grading component is connected to the processor.

At least one embodiment of the invention provides a method, including assembly of a simulation system having a simulator, a processor, and at least one display. The simulation system is provided along with documentation to a plurality of medical facilities within a system. Training on the use of the simulator, different simulations, and criteria for grading the performance on any given simulation is also provided. The training includes team training for conducting simulations using the simulation system. The simulations include breech vaginal delivery, umbilical cord prolapsed, eclampsia, neonatal resuscitation, operative vaginal delivery, postpartum hemorrhage, and/or shoulder dystocia.

More specifically, the breech vaginal delivery simulation assembles the birthing mannequin and the birthing fetus in a breech position. A medical staff is instructed that a patient feels pressure and has to push, wherein the patient is a birthing mannequin. The simulation observes whether of breech presentation of a birthing fetus is diagnosed from a cervical examination of the birthing mannequin by the medical staff. It is further observed whether a delivery preparation is performed by the medical staff, wherein the delivery preparation includes pushing the head of the birthing fetus until a buttocks of the birthing fetus begins to deliver in a sacrum anterior position. The simulation observes whether delivery maneuvers are performed by the medical staff. The delivery maneuvers are responded to with feedback during the simulation. The medical staff is debriefed and graded based on observations and predetermined scoring criteria.

The umbilical cord prolapse simulation assembles the birthing mannequin and a mobile cart having a touch-screen monitor. A medical staff is instructed that a patient's water has broken, wherein the patient is the birthing mannequin. The simulation observes whether the medical staff recognizes distress of the birthing fetus on the touch-screen monitor and observes whether the medical staff responds to the distress. If the medical staff waits for a vaginal delivery, the birthing fetus is kept within the abdomen of the birthing mannequin. The simulation observes whether the medical staff transfers the birthing mannequin to the operating room. The medical staff is debriefed and graded based on observations and predetermined scoring criteria.

The eclampsia simulation assembles the birthing mannequin and mobile cart with at least one touch-screen monitor. The birthing mannequin has a means for shaking to simulate a generalized seizure (e.g., the eclampsia simulation component). A medical staff is instructed that a patient has had a headache and it is getting worse, wherein the patient is the birthing mannequin. Moreover, the medical staff is instructed that the patient's blood pressure is increasing. A simulated eclamptic seizure is initiated by the simulator; and, the medical staff is observed for whether or not they perform assessment and intervention of the simulated eclamptic seizure. The intervention includes administrating medications and/or rolling the patient. The simulated eclamptic seizure is continued.

The medical staff is debriefed and graded based on observations and predetermined scoring criteria.

The neonatal resuscitation simulation assembles the birthing mannequin and the baby simulator. The medical staff is observed for recognition that the baby simulator is not breathing and has a heart rate less than 100 beats per minute. The simulation observes: whether the medical staff performs bulb suction, drying and stimulation of the baby simulator, removal of wet linens, and positive pressure ventilation with oxygen, and whether the medical staff recognizes that the baby simulator continues to not breath and the heart rate is less than 60 beats per minute. Moreover, the medical staff is observed for whether or not they perform interventions, such as, for example, chest compressions, intubation, and/or administration of medications. The simulation also observes: whether the medical staff examines an umbilical pulse for an actual heart rate, and whether the medical staff recognizes that the baby simulator is breathing and the heart rate has increased if five minutes have passed since the performance of the bulb suction and the medical staff has intubated the baby simulator and administered at least one dosage of epinephrine. The medical staff is debriefed and graded based on observations and predetermined scoring criteria.

The operative vaginal delivery simulation assembles the birthing mannequin, the mobile cart with at least one touch-screen monitor, and a vacuum delivery fetus, which allows a vacuum delivery or a forceps delivery. The medical staff is observed for whether or not they perform a cervical examination and recognize distress of the fetus. The simulation also observes: whether the medical staff counsels the patient on indications and risks of an operative vaginal delivery and whether the medical staff performs the operative vaginal delivery. The fetus is pushed to facilitate the operative vaginal delivery. The medical staff is debriefed and graded based on observations and predetermined scoring criteria.

The postpartum hemorrhage simulation assembles the birthing mannequin with a postpartum hemorrhage uterus insert, and the mobile cart with at least one touch-screen monitor. Bleeding of the birthing mannequin is simulated; and, the uterus of the birthing mannequin is not allowed to fully inflate. The simulation observes whether the medical staff performs assessments and maneuvers. The maneuvers include a fundal massage, inspection of the cervix and/or vagina for lacerations, manual clearing of the uterus, and/or administration of medications. If the maneuvers include the fundal massage, the simulating of the bleeding continues. The medical staff is debriefed and graded based on observations and predetermined scoring criteria.

The shoulder dystocia simulation assembles the birthing mannequin and mobile cart with at least one touch-screen monitor. The medical staff is informed that the patient is having a contraction and feels that she has to push, wherein the patient is the birthing mannequin. The head of the fetus is pushed until the head delivers; and, the fetus is restituted, wherein the shoulder of the fetus is anterior. Traction on a harness is applied and the shoulder is not allowed to deliver. A timer is activated to measure the head-to-body delivery interval. The simulation observes whether the medical staff recognizes shoulder dystocia and performs maneuvers. Maneuvers are responded to with feedback. If the medical staff delivers a posterior arm of the fetus, the fetus is allowed to deliver. If the medical staff does not deliver the posterior arm of the fetus, the medical staff is allowed to perform a Zavenelli maneuver or discontinue delivery. The timer is stopped; and, the medical staff is debriefed and graded based on observations and predetermined scoring criteria.

Given the following enabling description of the drawings, the apparatus should become evident to a person of ordinary skill in the art.

IV. BRIEF DESCRIPTION OF THE DRAWINGS

FIGS. 7A-7B illustrate scoring sheets.

FIG. 8 illustrates a debriefing questionnaire.

FIGS. 9A-9C illustrate an eclampsia simulation component

V. DETAILED DESCRIPTION OF THE DRAWINGS

Figure 1:
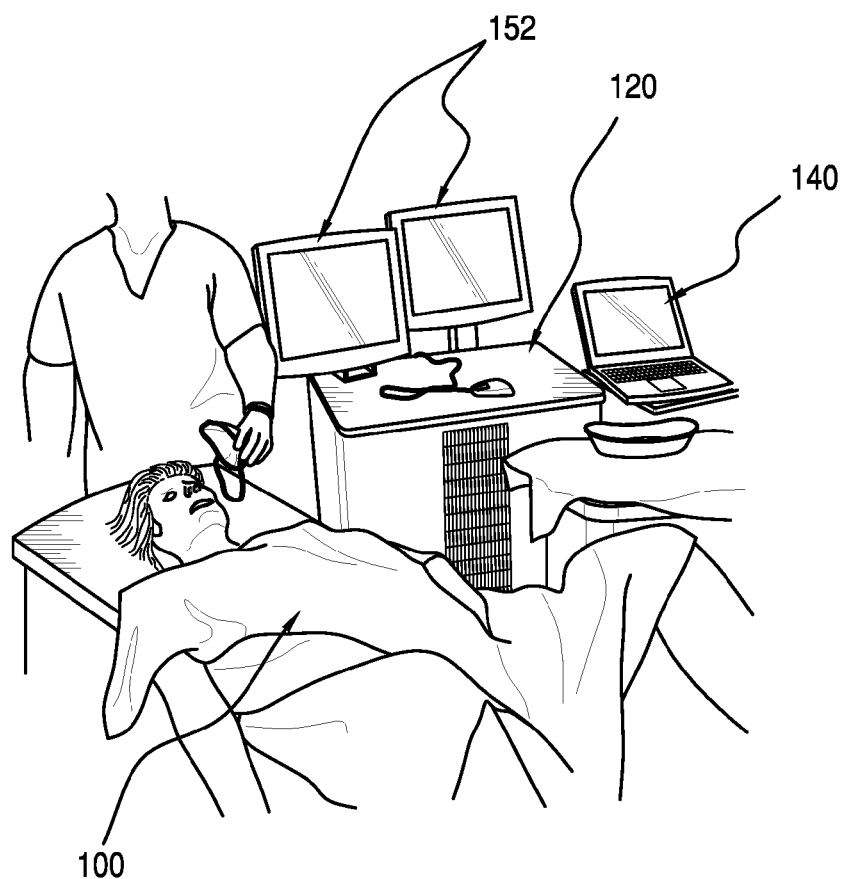
FIG. 1 illustrates an exemplary arrangement according to the invention with a simulator and equipment connected to the simulator to display information relevant for the simulation.

An embodiment of the invention combines simulation training for obstetric emergencies and TEAMSTEPPs training Simulation training provides a platform with which to train and test both soldiers and physicians in a nearly endless variety of scenarios. It allows for physicians, nurses, and ancillary staff to train for uncommon yet life-threatening emergencies with no risk to a patient or her unborn child. In at least one embodiment, simulating obstetric emergencies does not require extremely expensive mannequins and software to accomplish. The equipment is also portable and can be used on any labor and delivery ward so that it is accessible to those who need the training most. An embodiment of the invention includes a comprehensive curriculum with simulations and evaluation tools that objectively evaluate staff (physicians, nursing, support personnel) performance during obstetric emergencies. To accompany the curriculum, a mobile obstetric simulator is used that can be placed at specific training sites. To ensure that the focus is improving the entire team approach to patient care, the evaluation tools are designed to also evaluate teamwork during the emergencies based on the TEAMSTEPPs training model.

TEAMSTEPPs training, which is derived from lessons learned from the airline industry's extremely successful safety protocols, teaches physicians, nurses, and other personnel to work together as a team. The framework in which the tenets are implemented results in culture change that promotes teamwork rather than adversarial relationships.

As stated previously, the invention in at least one embodiment combines the ongoing TEAMSTEPPs training model with an obstetric emergencies simulator that will be placed at each specified medical training facility. This allows for regular training to be conducted on several levels for patient safety. By training resident and staff physicians, the care of patients will improve when the unpreventable obstetric emergencies, such as a shoulder dystocia which is when the fetal shoulder becomes lodged behind the symphysis and will not spontaneously deliver, occur. In addition, the mobile simulator allows for emergency drills on the actual labor and delivery units that will involve multiple levels of care, including nursing, physicians, and ancillary staff. This simulation training will provide a safe, no risk environment where both technical performance as well as progress on teamwork is objectively evaluated and improved, and any systems problems identified before a true emergency or poor outcome occurs.

To accomplish this, an embodiment of the invention is implemented to provide training where it can have the greatest effect. This means at large training facilities that not only have a high number of deliveries, but are also training residents who will become the future staff. By improving the performance of these physicians, the largest immediate impact for patients as well as on the facilities that the graduating residents are assigned to will occur. Data on both technical and teamwork performance will be collected from these large training facilities.

An embodiment of the invention has far reaching effects on how military and civilian labor and delivery units function and the care they provide. Not only is there a heightened focus on patient safety, but also the ability for the commands to objectively measure technical and teamwork performance during simulated emergencies with no risk to patients or their infants. In addition, this training provides a tangible example to the civilian sector and the patients that the military health care system is committed to improving patient safety.

Figure 2:
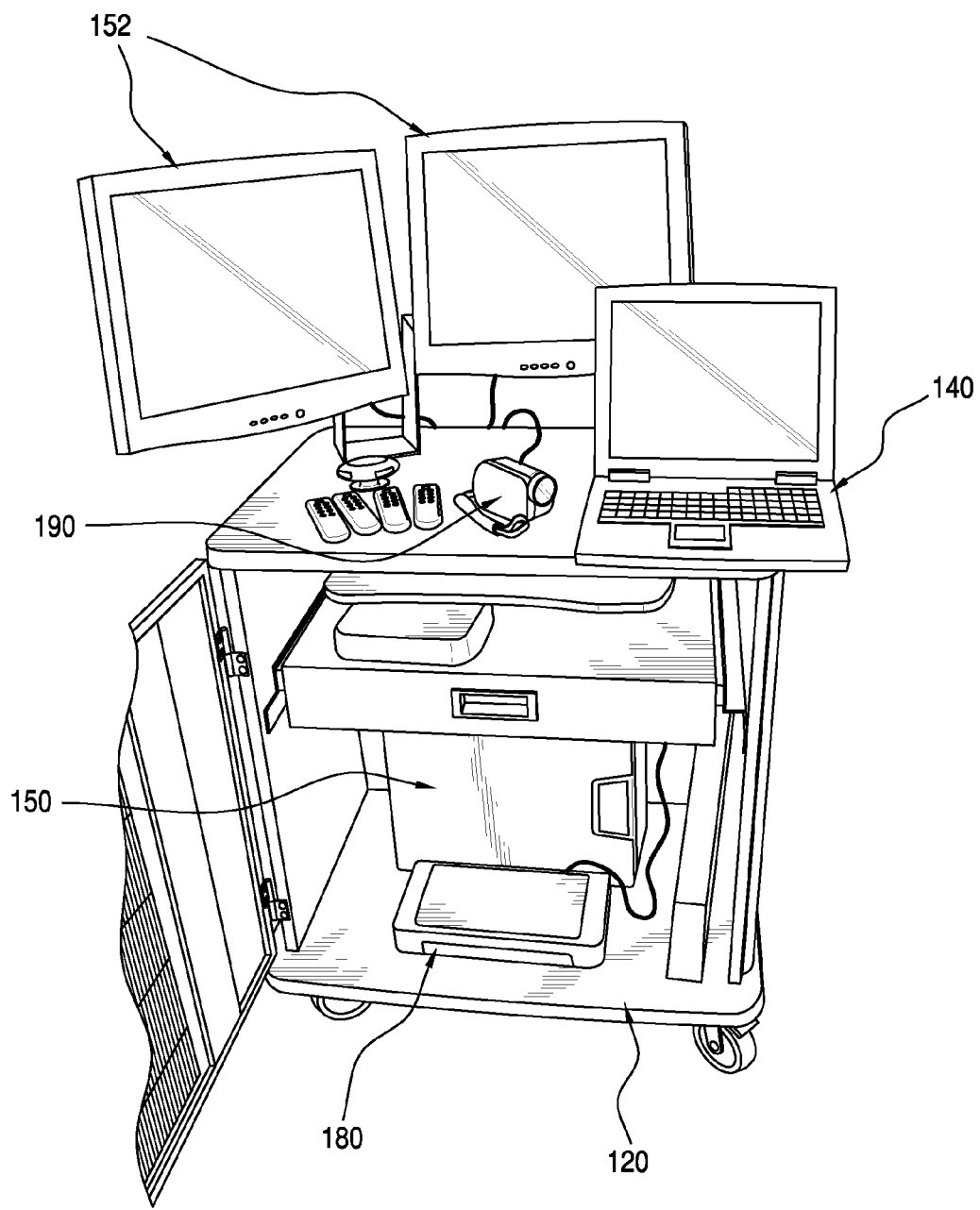
FIGS. 2 and 3 illustrate an exemplary monitor arrangement and associated equipment to run the simulation in conjunction with the simulator.
Figure 3:
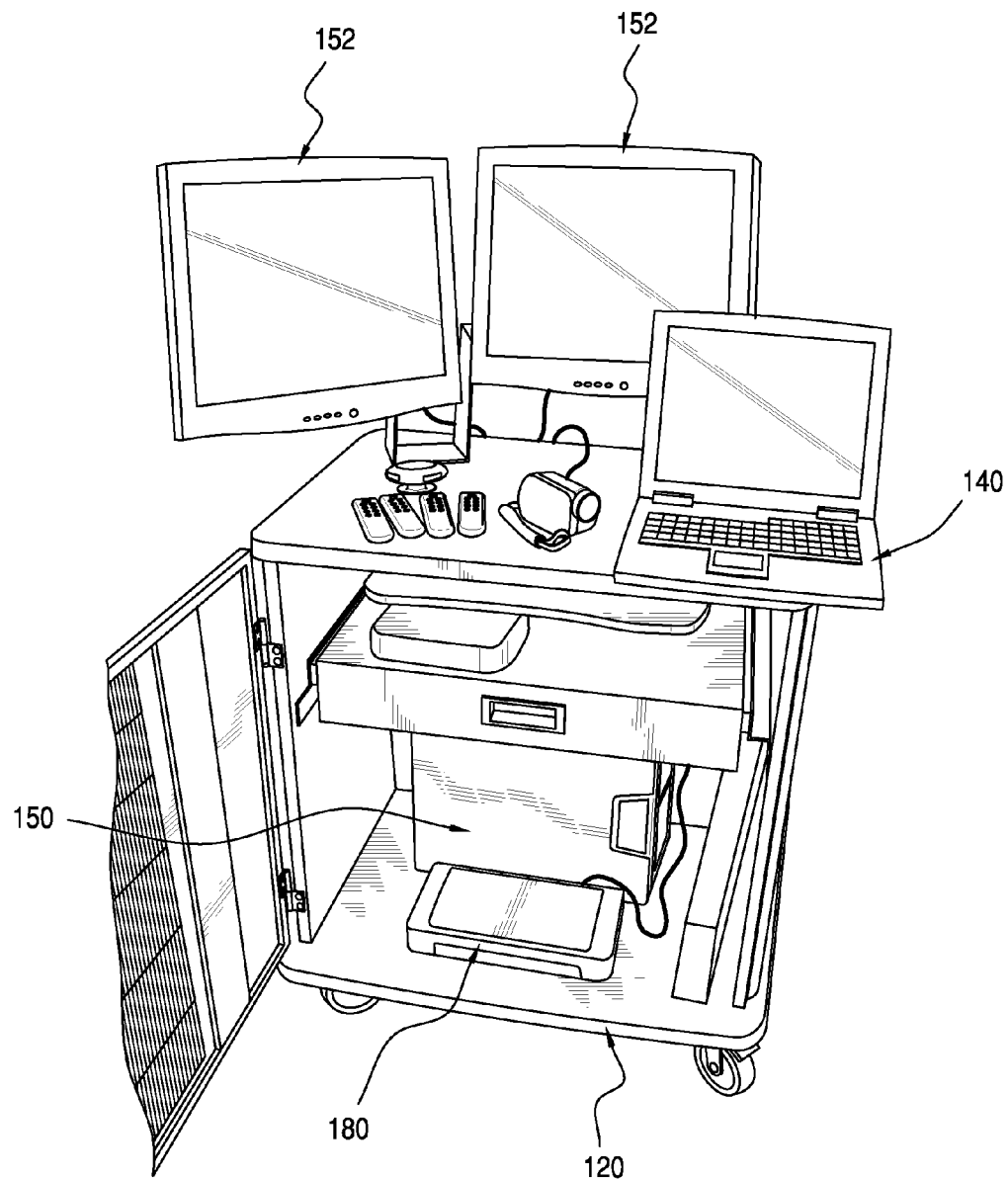
Figure 4:
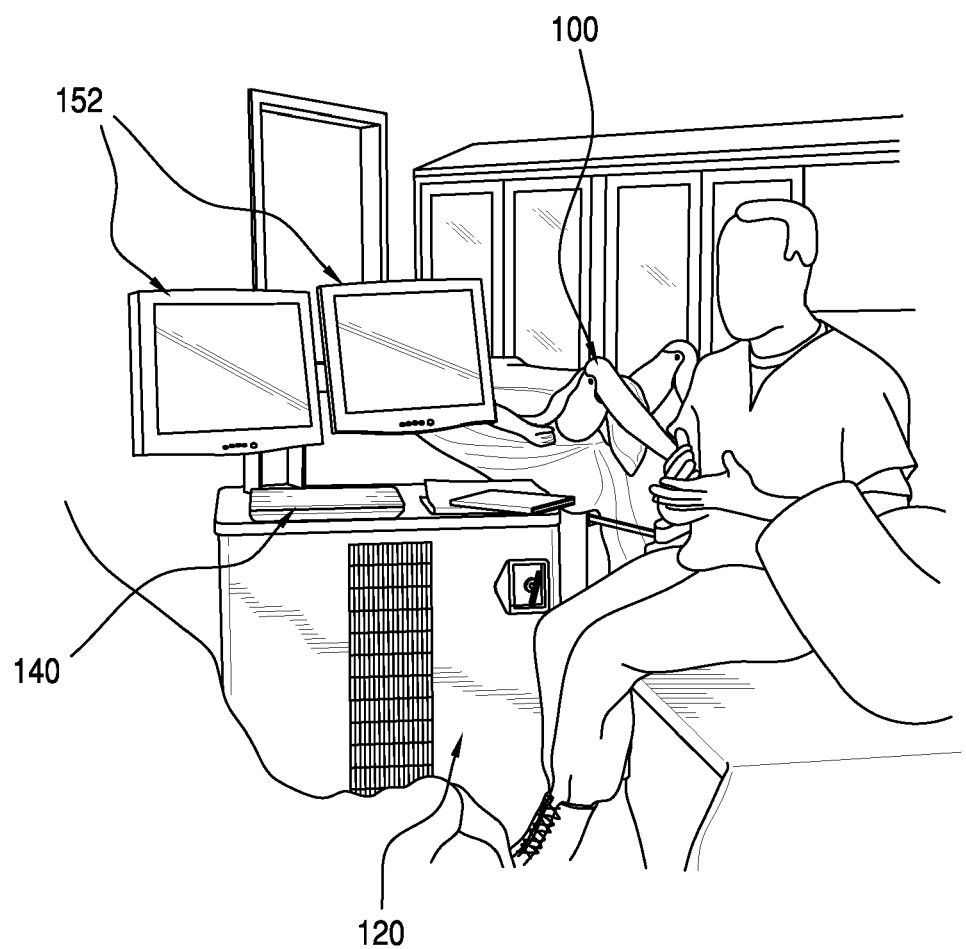
FIG. 4 illustrates an exemplary arrangement according to the invention in a medical setting.
Figure 5:
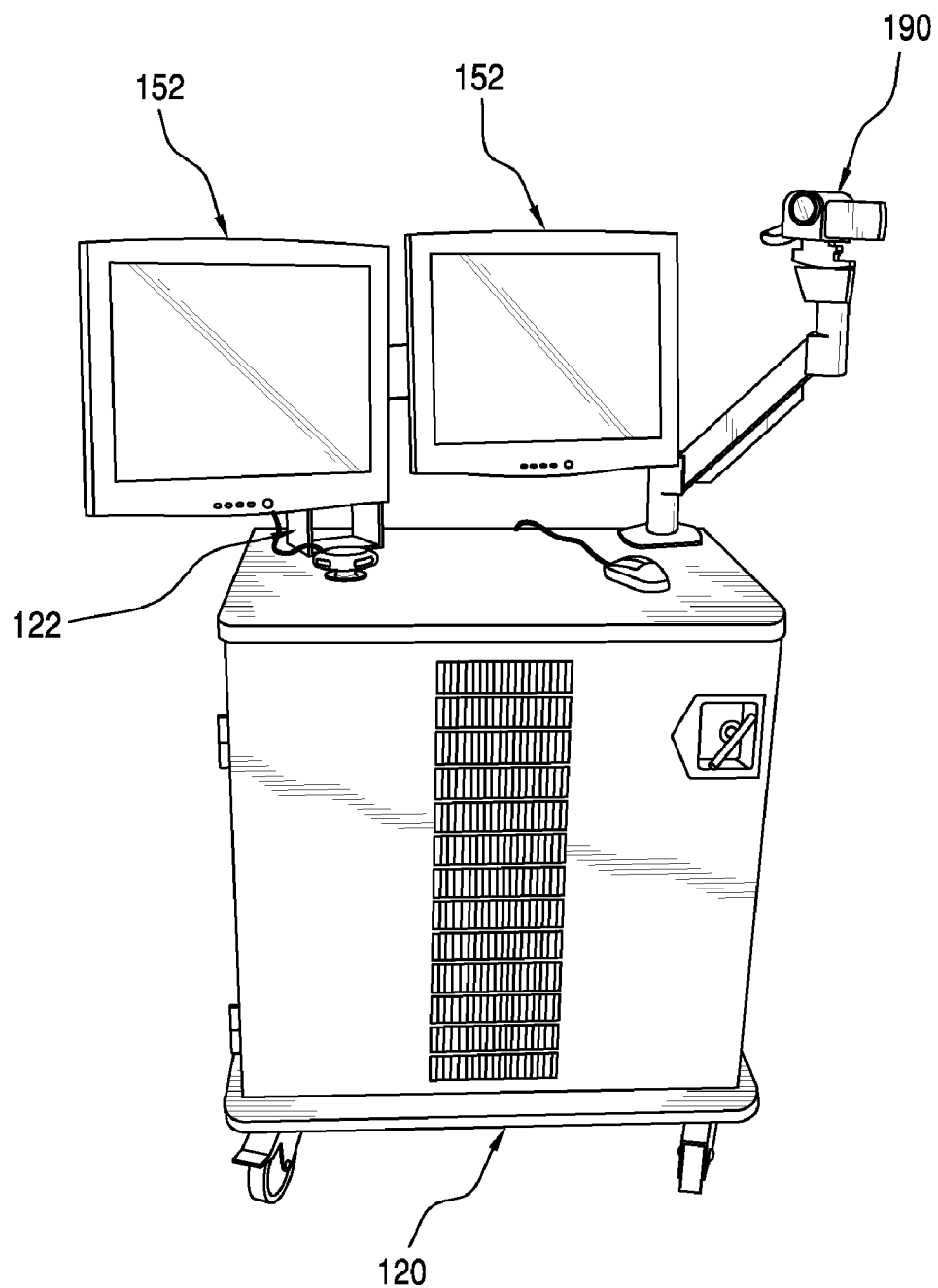
FIG. 5 illustrates a cart with some peripheral equipment attached.

FIG. 1 illustrates a simulator 100 such as the Gaumard Scientific S555 Noelle simulator that is connected to a laptop 140 and a second computer 150 (illustrated in FIGS. 2 and 3). These two computers 140, 150 in at least one embodiment together run the simulation and the responses to different treatments provided by the medical teams undergoing a simulation. The second computer 150 in at least one embodiment drives the displays 152 to provide medical information such as heart rate and blood pressure, that is typically present in a medical setting and to provide additional information as to the status of the simulated patient in view of the simulation stage and treatment to that time. The camera 190 (illustrated in FIG. 2) is provided to record a particular simulation to assist with replay and to allow participants to view themselves in action during the course of the simulation as part of the debriefing.

As illustrated in FIG. 1, the simulation is setup for a team of medical professionals to work together during the course of the simulation to allow for better understanding of each member's role and where the different participants may be able to offer assistance or knowledge as the situation may dictate. FIGS. 2-5 illustrate different aspects of the invention.

One particular implementation of the system includes the following components, which one of ordinary skill in the art will appreciate based on this disclosure that specific reference to particular manufacturers and products are to better identify the desired characteristics and thus can be substituted for by different equipment if desired:

1. custom articulating camera arm;
2. lockable and mobile security cart 120 (30 W SM/FG 5" castors) for housing the computer equipment and peripherals to better facilitate storage and convenience of use of the system with the mannequin in most implementation be stored in a separate container such as a hard case or a bag;
3. flat panel mount double for holding the medical monitors 122;
4. universal keyboard and mouse;
5. 30 W enclosed cart drawer SIL/M;
6. a camcorder with at least a 30 GB hard drive such as the JVC Camcorder JVC GZMG255US;
7. a JVC Everio CU-VD10 Share Station-DVD-RW drive-Hi-Speed USB;
8. a HP DJ 460c 17/6 PPM 8.5×14 or other similar printer 180;
9. a 24-pad audience response system (CPS) IR System (Number each set 1-24) such as the eInstruction Corp. Classroom Performance System;
10. an IPOD NANO™ 2 GB Silver or other audio player (MP3 player) with a protective case for playing sounds during the course of the simulation;
11. V10 NB speakers USB-PC MAC USB VOL CTRL or other similar speakers;
12. maternal & neonatal birthing simulator (such as the Gaumard Scientific S555 Noelle simulator) with a full size articulating full-body female, intubeable airway with chest rise, IV arm for receiving medications and other fluids, removeable stomach cover, practice leopold maneuvers, multiple fetal heart sounds, automatic birthing system, measure head descent and cervical dilation, multiple placenta locations, replaceable dilating cervices, practice postpartum suturing on vulval inserts, one articulating birthing baby with placenta, PEDI® blue neonatal simulator with SmartSkin™ (LED lights will turn blue and respond to positive pressure ventilation), and a postpartum hemorrhage and palpation module that has NOELLE S550.100 with PEDI® Blue full term neonate (in an embodiment of the invention, the delivery motor is removed);
13. two 17 inch touch screen monitors for fetal heart rate tracing and displaying maternal vitals (present scenarios will be loaded on the computer);
14. one computer (or other processing equipment) (although a laptop could be substituted for this computer instead of a desktop computer being used as illustrated) to control monitors and communication wirelessly with a laptop;
15. one laptop computer with wireless communication to the first computer (although a desktop computer could be substituted);
16. a boggy uterus with blood capability (PPH);
17. an articulating baby;
18. elevating pillow for leopold maneuvers;
19. an articulating fetal baby (operative vaginal delivery fetus), umbilical cord (in an embodiment of the invention, a pulse is felt in the umbilical cord), and placenta for vacuum delivery;
20. a Eclampsia model; and
21. a CPS debriefing/grading system having individual keypads (IR system), labeled keypads (e.g., physician grader 1, physician grader 2, primary nurse), and on-screen anonymity.

Figure 6A:
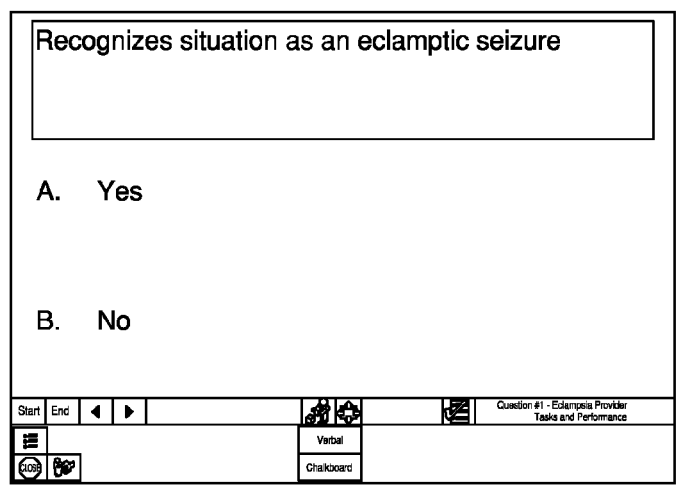
FIGS. 6A-6C are screen shots illustrating a grading system.
Figure 6B:
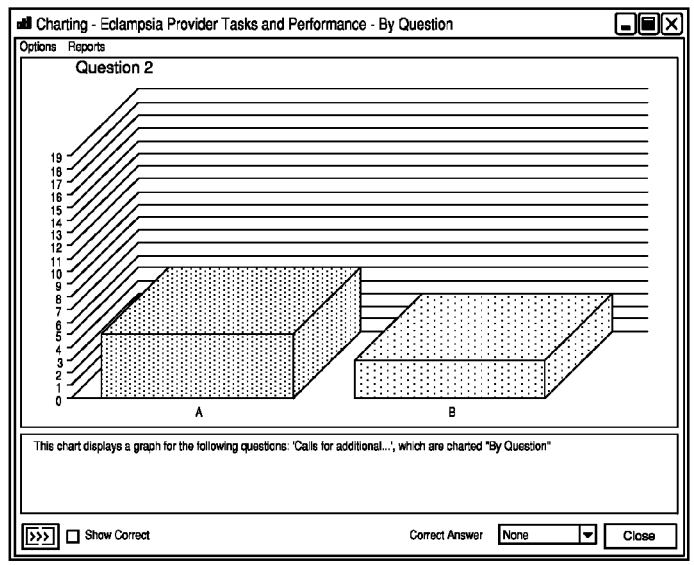
Figure 6C:
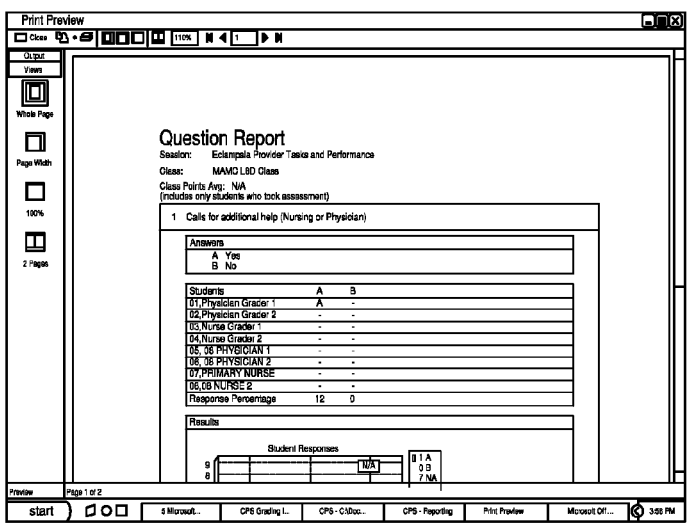

FIGS. 6A and 6B illustrate an example of on-screen anonymity. Each grader (e.g., Physician 1, Physician 2, Nurse 1, Nurse 2) inputs scores into the system. For example, a scoring factor for the eclamptic seizure simulation is whether the provider recognizes the situation as an eclamptic seizure (FIG. 6A; A=Yes, B=No). After all of the graders have input their scores, the combined scores are displayed, wherein the graders remain anonymous (FIG. 6B; five graders scored a "Yes", three graders scored a "No"). As illustrated in FIG. 6C, reports can be produced in order to view the scoring input by graders for a specific scoring factor (e.g., "Calls for additional help").

There are a variety of potential problems that the system will be able to address for a variety of reasons. Drawbacks to medical simulation in the past have included a lack of resources required to develop training scenarios, staffing to implement the training, and the need for validation of training methods in an objective manner. In addition, the equipment itself is often very expensive to purchase and maintain and may require a large amount of space to store which is difficult to justify if it is only needed on a monthly basis. The present system addresses all of these issues. While labor and delivery units are by their very nature busy, fast-paced environments, the staffs are typically committed to patient safety. The equipment for the present system is not only relatively inexpensive compared to some simulation products, where a single mannequin or simulator may cost over $100,000, and may be easily stored so that it will not be necessary for smaller facilities to take up an entire exam room or other space in order to maintain a state-of-the-art simulator training program. In addition, its portable design allows it to be deployed to small facilities and even overseas for humanitarian missions if needed or desired.

The following provides a background and overview of the simulation system. Goals of the mobile obstetrics emergency simulator include improve patient safety, improve teamwork and technical performance, identify and correct systems issues unique to each labor and delivery unit. Another goal is to create a mobile platform that accomplishes the following: run simulations on actual labor and delivery units, provide a standardized curriculum, evaluate both teamwork and technical proficiency, integrate a no-fault debriefing tool, be able to monitor progress over time, and inexpensive. Other goals include: 1) provide simulation training for all levels of providers (also referred to herein as physicians, residents, nurses, staff, participants, team, and allied health personnel) to improve cognitive, technical and teamwork skills in a "no-risk" to the patient environment, and 2) improve patient and casualty outcomes and patient safety in all environments.

Differences between Central Simulation Committee (CSC) and TMA curriculum include: TMA curriculum is specific to the labor and delivery team, CSC grading is done online and is directed at residents/individuals, CSC Obstetric simulations are different because assistants are not necessarily available, and equipment is essentially the same for both and is used for both at dual institutions.

An embodiment of the invention provides for the running of simulations. Specifically, a method sets up the room, briefs the initial participant on the clinic scenario, and runs the simulation drill. Moreover, the debriefing is conducted on the CPS system, the evaluation is filled out on the CPS system, and the evaluation forms are downloaded. Entities are debriefed, e.g., the Command, pediatrics, anesthesia, labor and delivery staff, obstetrics/gynecology, and family medicine.

The curriculum of an embodiment of the invention includes a breech vaginal delivery, umbilical cord prolapsed, eclampsia, neonatal resuscitation, operative vaginal delivery, postpartum hemorrhage, and shoulder dystocia. The simulation examples were chosen and described in order to best explain the principles of the invention and the practical application, and to enable others of ordinary skill in the art to understand the invention for various embodiments with various modifications as are suited to the particular use contemplated.

Breech Vaginal Delivery Simulation

The following description provides a curriculum example for a breech vaginal delivery simulation. One of ordinary skill in the art will appreciate based on this disclosure that specific process steps are for illustration only, and that certain steps may be omitted. Many modifications and variations will be apparent to those of ordinary skill in the art without departing from the scope and spirit of the invention.

An exemplary clinical scenario for breech vaginal delivery includes a 26 year-old G3P2002 at 36+0 weeks, who is presented to the triage room of Labor and Delivery. On exam, the fetus is in a breech presentation with the buttocks visible at the introitus without pushing. The fetal heart rate is 150 beats per minute. The estimated weight is 7 lbs. The woman states she has had two vaginal deliveries of 8 lb infants and does not want a cesarean section. In an alternate clinical scenario, a 31 year old G1P0 at 35+4 weeks is presented to labor and delivery. She reports feeling a lot of pressure and that she began leaking "brown fluid" about 30 minutes ago when she thinks her water broke. The fetal heart rate is 140 beats per minute.

In an embodiment of the invention, basic instructions for participants include: treating the scenario as real as possible, using mask/gloves/gown as needed, requesting assistance if needed, ignoring the camera, and do not cut the perineum, but indicate if you would make an episiotomy. Other instructions include: retrieving any medications that you need during the scenario, but do not open them to actually give them in the room, and you may move the patient to the operating room and even to the operating room table if needed, but you do not need to physically open up the instrument sets.

The simulator utilized for the breech vaginal delivery example is the NOELLE birthing mannequin with the standard birthing fetus that is placed in a breech position although other simulators could be used. In addition, the touch-screen monitors that are attached to the mobile cart may be used. The room is set up similar to a delivery room. The simulator is on an examination table, gurney, or bed with the lower torso draped. A delivery table is available with basic equipment. If videotaping is performed, the camera can be held by a staff member, a tripod, or the camera arm on the cart.

Equipment utilized for the breech vaginal delivery includes the birthing simulator, a standard delivery table (e.g., bulb suction, Kelly clamps, scissors), video camera, Piper forceps, fetal monitor, and audio player (e.g., MP3 player). The vital sign software of the fetal monitor is used to demonstrate worsening maternal status during the simulation. Incorporating this into the training adds to the realism of the scenario as this is heard by the providers during the simulation. As described further below, after starting up the software, files are loaded at specified time intervals. Personnel utilized for the breech vaginal delivery includes staff to control the fetus and maternal mannequin, assistants to assist with maneuvers, and/or staff to film the procedure. Staff member(s) could also be utilized as live actor(s) accompanying the patient to add realism and play the part of a family member to add stress/distraction/confusion in the simulation.

Tips to be given to the simulation participants include: do not leave the Piper forceps out in view; do not put the elevating pillow into the abdomen for this delivery as it will make things very difficult; and, remove the cervix that comes with the model as it generally will hold up the fetus and it is not needed for this simulation. Other tips include: use plenty of lubrication for the fetus (e.g., silicone lubricant, sonogram gel); and, only simulate an episiotomy if you feel that one is necessary and do not actually cut the mannequin.

Thus, in an embodiment of the invention, a case flow for the breech vaginal delivery includes setting up the NOELLE simulator, turning fetal monitors on, loading the desired scenario, and clicking "Update". The initial provider is briefed on the clinical scenario and the provider enters the room. The primary staff tells the provider that the patient feels pressure and has to push. The provider addresses the patient, performs a cervical examination, and diagnoses the breech presentation. The providers are given a chance to counsel the patient about a breech vaginal delivery before pushing the baby out if they begin to discuss this. If the providers do not counsel the patient spontaneously, the person controlling the fetus asks "are babies supposed to come out breech?" to give them another opportunity to counsel the patient.

The fetal head is pushed until the buttocks begins to deliver in the sacrum anterior position. The providers are allowed to prepare for delivery of the breech fetus. As the breech delivers, the providers recognize the breech presentation and begin maneuvers. Maneuvers are responded to with feedback if they ask questions; and, the fetus is continually pushed to deliver. When the providers have completed the delivery, they are told that the scenario is over.

In an embodiment of the invention, if the providers insist on a cesarean section, the fetus is pushed out so that they must do the delivery. The providers are given a short amount of time to prepare for the delivery (e.g., call pediatrics, find Pipers). After the scenario is over, all of the participants are gathered together in the delivery room with the mobile obstetrics simulator. Clickers are handed out to the appropriate staff participants. The clickers are labeled for the physician grader 1, primary physician, primary nurse, and so on. The CPS system is opened; and, the debrief for the appropriate scenario is loaded. The basic assumption is reviewed with the team; and, the teamwork debriefing is conducted. After the teamwork debriefing, critical actions for the simulation are reviewed with the team. The team members are asked for any lessons learned and responses are recorded so that they can be implemented on the labor and delivery ward if needed. The labor and delivery team is dismissed; and, the provider tasks and performance grading is opened for the simulation scenario. The provider tasks and performance grading is gone through with all of the graders (e.g., 2 physicians and 2 nurses who observed the simulation). The teamwork debriefing, provider tasks, and performance grading is exported.

The following are potential factors to consider when scoring the providers on the vaginal breech simulation: calls for help, suggestion to move to the operating room, allowing breech to deliver to umbilicus with maternal pushing, episiotomy, delivery of leg (splint medial thighs, parallel to femur and sweeps laterally), repeat on opposite leg, placement of moist towel on fetal trunk, fingers on bones and groins, gentle downward traction with sacrum anterior, 90°-180° rotation to deliver arms, delivery of arms (sweeping in long axis of bone downward), and rotation and repeating with second arm. Examples of formats for vaginal breech simulation scoring sheets are illustrated in FIG. 7.

Regarding use of the Piper forceps, potential grading factors include: using the forceps after the shoulder and arms have been delivered and the head is in the pelvis with the chin posterior, holding the infant in a towel (infant should not be held above the horizontal plane), applying the left blade first, carrying the infant's body toward the mother's right side, assuming a kneeling position while the left blade is held by the left hand with the handle below the patient's right thigh and beneath the body of the infant (the toe of the blade is guided into the vagina with the provider's right hand), sweeping the handle in an arc downward and towards the midline while the toe of the blade passes into the pelvis along the side of the infant's head to the right ear, and introducing the right blade in a similar fashion (if resistance is met, the toe is introduced more posteriorly and wandered along the side of the head). Other potential grading factors regarding the use of piper forceps include: locking the shanks (the infant is allowed to straddle the forceps), applying downward traction in the direction of the handles until the chin appears at the outlet, elevating the handles with traction to conform to the curve of the pelvis, preserving the head flexion (the body rests on the shanks of the forceps while the neck is splinted by the fingers of the provider's splint neck left hand), and performing an extraction with the handles close to horizontal while delivering the head with the forceps still in place.

Regarding performance of the Mauriceau-Smellie-Veit maneuver, potential scoring factors include: applying the index and middle finger over the maxilla to flex the head while the body rests on the palm and forearm, hooking two fingers of the other hand over the neck while grasping the shoulder and applying gentle downward traction, and applying suprapubic pressure by an assistant. The skill and safety of the physician in performing the breech vaginal delivery are other scoring factors.

In at least one embodiment, teaching points and critical actions discussed in debriefing include: knowledge of risk factors for an emergency vaginal breech delivery, ability to execute the critical actions as outlined by the scoring factors, and review of maneuvers as described by the scoring factors. Demonstrations are preformed on the mannequin during the debriefing process. Furthermore, potential complications are discussed, such as fetal head entrapment. The actual simulation takes approximately 5-7 minutes to complete. Debriefing takes approximately 10-15 minutes depending on the team's performance.

Umbilical Cord Prolapse Simulation

The following description provides a curriculum example for an umbilical cord prolapse simulation. One of ordinary skill in the art will appreciate based on this disclosure that specific process steps are for illustration only, and that certain steps may be omitted. Many modifications and variations will be apparent to those of ordinary skill in the art without departing from the scope and spirit of the invention.

An exemplary clinical scenario for an umbilical cord prolapsed includes a 25 year old G1P0 at 40+3 weeks, who is presented to labor and delivery with a chief complaint of regular uterine contractions. On examination, she is noted to be C/3/−3 VTX with intact membranes. The fetal heart rate tracing (FHRT) has been reassuring. The patient's husband informs the providers that his wife feels like her water broke. An alternative clinical scenario involves a 33 year old G2P1001 at 37+0 weeks, who was admitted last night for therapeutic rest and given morphine sulfate approximately 8 hours ago. The FHRT has remained reassuring and she is now beginning to feel more pressure and would like to be evaluated.

The simulator utilized for the umbilical cord prolapsed example is the NOELLE birthing mannequin although other simulators could be used. In addition, the touch-screen monitors that are attached to the mobile cart are available for use. The room is set up similar to a delivery room. The simulator is on an examination table, gurney, or bed with the lower torso draped. A delivery table is available with the basic equipment. Additional equipment includes a Simulating High Acuity Deliveries (SHAD) birthing simulator, chronograph, fetus in vertex position with umbilical cord prolapsed through, cup of water to pour on the perineum, pads to simulate amniotic fluid, and a fetal monitoring system.

Specifically, in at least one embodiment, a case flow for the umbilical cord prolapsed simulation includes setting up the mannequin and opening the fetal monitoring software. The file "Umbilical Cord Prolapse" is opened and the fetal heart rate tracing is updated. The initial provider (e.g., nurse or physician) is briefed on the clinical situation prior to entering the room. The provider enters the room and is informed that the patient's water may have just broken. The provider recognizes fetal distress on the monitor and begins evaluation. The fetal monitor is up and running and demonstrates a significant bradycardia.

The team is allowed to respond to the umbilical cord prolapse. If they try to wait for a vaginal delivery, the baby is kept in the abdomen of the simulator. The team is allowed to take the patient to the operating room and transfer her to the operating room table. The scenario is stopped when the patient has been transferred to the operating room table. The team returns to the room with the mobile obstetrics simulator for the debriefing.

During debriefing, in at least one embodiment, clickers are handed out to the appropriate staff participants and the CPS system is opened. The debrief for the appropriate scenario is loaded and the basic assumption is reviewed with the team. After the teamwork debriefing, critical actions for the simulation are reviewed with the team. The team members are asked for any lessons learned, which are recorded so they can be implemented on the labor and delivery ward if needed.

The labor and delivery team is dismissed and the provider tasks and performance grading for the simulation scenario are opened and reviewed with all of the graders. The teamwork debriefing, provider tasks, and performance grading are exported.

The following are potential factors to consider when scoring the providers on the umbilical cord prolapse simulation: counseling patient regarding the finding of a prolapsed cord, calling for pediatrics, calling for anesthesia, keeping a hand in the vagina to elevate the fetal head (the entire time it takes to get the patient into the operating room), calling for a scrub technician, the amount of time to diagnose the umbilical cord prolapse from the time the first person entered the room, and the amount of time to get the patient into the operating room from the time the cord prolapse was diagnosed.

In an embodiment of the invention, teaching points and critical actions to discuss in debriefing include: understanding and verbalizing risk factors for umbilical cord prolapsed, executing the critical actions as outlined in the scoring factors, and evaluating the emergency team response times and how the situation was communicated. The actual simulation itself only takes approximately 5-7 minutes to complete. Debriefing and additional practice with the maneuvers takes approximately 10-15 minutes.

In at least one embodiment, when the umbilical cord is palpated in the vagina, the examiner does not remove their hand, but rather attempts to elevate the presenting part off of the umbilical cord. The patient is taken immediately to the operating room for an emergency cesarean delivery. The initial examiner's hand remains in the vagina until the baby is delivered by cesarean section. If there is any delay in performing the cesarean section, terbutaline is administered to decrease uterine contractions, or the bladder is filled with 500 mL of fluid to elevate the presenting part off of the cord.

Eclamptic Seizure Simulation

The following description provides a curriculum example for an eclamptic seizure simulation. One of ordinary skill in the art will appreciate based on this disclosure that specific process steps are for illustration only, and that certain steps may be omitted. Many modifications and variations will be apparent to those of ordinary skill in the art without departing from the scope and spirit of the invention.

An exemplary clinical scenario for the eclamptic seizure simulation includes a 19 year old G1P0 at 38+4 weeks who was admitted in active labor this morning. Her prenatal course was uncomplicated, with the exception that her cervical examination was C/4/−2 just before she received her epidural about 30 minutes ago. She now reports a new onset headache and her nurse would like her to be evaluated. An alternate clinical scenario involves a 37 year old G6P5005 at 39+0 weeks with a prenatal course complicated by chronic hypertension with baseline proteinuria. She was admitted for augmentation of labor this morning and is now on 10 miu/min of oxytocin. Her cervix was just examined and was C/5/−1. The nurse would like the fetal heart rate tracing to be reviewed.

In at least one embodiment, the simulator that is utilized for the eclamptic seizure simulation is the NOELLE birthing mannequin although other simulators could be used. The birthing mannequin includes an internal eclampsia modification, which causes the mannequin to shake and simulate a generalized seizure when activated. The seizure continues as long as the button is held down and stops when the button is released.

The delivery fetus, in at least one embodiment, is placed into the maternal abdomen with the cervix. The abdominal cover is replaced. Thus, if the provider checks the patient, they will know that the patient is only a few centimeters dilated. The fetal heart rate monitors are used to demonstrate variable decelerations during the eclamptic seizure. Incorporating this into the training by using it to produce fetal heart rate (FHR) changes during and after the seizure adds to the realism of the scenario as this is heard by the resident during the simulation. In order to do this, after starting up the software, the file "Eclampsia Initial" is loaded; and, the "Update" button for the fetal monitors is clicked before the provider enters the room. The "Eclamptic Seizure" and "Update" button are clicked when the patient begins to have a seizure. The NOELLE birthing mannequin has an intravenous therapy (IV) with tubing going to an IV bag taped to her arm.

In an embodiment of the invention, the providers include staff (plays part of the nurse) to control the fetus and maternal mannequin, and staff to film the procedure (or a tripod or camera arm mounted on the cart is used). Staff member(s) could also be utilized as live actor(s) accompanying the patient to add realism and play the part of a family member to add stress/distraction/confusion in the simulation.

The case flow of the eclamptic seizure simulation includes setting up the mannequin, turning on the fetal monitoring software, loading the "Eclampsia Initial" software, setting the fetal monitors to on, and clicking "Update". The initial provider is briefed on the clinical scenario; and, the provider enters the room. The providers are allowed to introduce themselves and they are informed that the birthing mannequin has had a headache for approximately 24 hours and it is getting worse. The staff playing the part of the patient's family member informs the resident that "her blood pressure readings have been going up. The last one was 155/100." The button for the eclamptic seizure is pushed and the timer is started. "Eclamptic Seizure" is opened in the fetal monitoring software and "Update" is clicked. The providers recognize the complication and begin assessment and interventions, including calling for assistance. The team is allowed to administer medications, roll the patient, or do whatever other interventions they desire. The seizure is continued for approximately 4 minutes, regardless of what interventions are undertaken.

When the seizure is over, the providers are given approximately 30 seconds to discuss continuing magnesium medications and then they are informed that the scenario is over.

In at least one embodiment, the providers are not given any more patient history than what was given before they walked into the room. If the providers ask whether or not the patient has proteinuria, they are told that the patient's admission urinalysis showed 2+ protein. If medication doses are incorrect, this is addressed in the debriefing. A cesarean section is not done unless the bradycardia lasts for more than approximately 10 minutes after the seizure. An emergency cesarean section is not required after an eclamptic seizure. Eclamptic seizures are generally self-limited to approximately 2-4 minutes. Magnesium should not be given as an IV bolus, but rather over approximately 15-20 minutes.

In an embodiment of the invention, clickers are handed out to the appropriate staff participants, the CPS system is opened, and the debrief is loaded for the appropriate scenario. The basic assumption is reviewed with the team; and, the teamwork debriefing is conducted. After the teamwork debriefing, critical actions are reviewed for the simulation with the team; and, the team members are asked for any lessons learned to be recorded and potentially implemented on the labor and delivery ward if needed. The labor and delivery team is dismissed, the provider tasks and performance grading for the simulation scenario is opened and reviewed with all of the graders (e.g., up to 2 physicians and 2 nurses who observed the simulation). The teamwork debriefing, provider tasks and performance grading are exported.

The following are potential factors to consider when scoring the providers on the eclamptic seizure simulation: recognizing the situation as an eclamptic seizure, calling for additional help (e.g., nursing or physician), calling for anesthesia, moving the patient to a lateral decubitus position, inserting a tongue blade into mouth, placing supplemental oxygen on the patient, placing a pulse oximeter on the patient, administering magnesium sulfate to control the seizure (e.g., correct dose of 6 grams given through an IV over 15-20 minutes, given as a bolus (<15 min)), administering diazepam to control the seizure (e.g., correct dose of 5 grams given through an IV over 15-20 minutes, given as an IV push), and administering hydralazine to control hypertension (e.g., correct dose of 5-10 mg given through an IV push), administering labetaolol to control hypertension (e.g., correct dose of 20-40 mg given through an IV push), and deciding to deliver by cesarean section.

In at least one embodiment, other potential scoring factors include: addressing the eclamptic seizure in a timely manner, remaining calm during the eclamptic seizure simulation, communicating well with assistants during the simulation, overall performance of the provider during the eclampsia scenario, and preparedness of the provider for the eclampsia complication. Points to discuss during the debriefing include: knowledge of medications to treat eclampsia, understanding and verbalizing risk factors for preeclampsia and eclampsia, recognition that eclamptic seizures are generally short (e.g., lasting 2-4 minutes) and magnesium sulfate is continued afterwards to prevent further seizures, ability to execute the critical actions as outlined by the scoring factors, reviewing medication dosages and route of administration, and recognition that the fetal heart rate tracing generally recovers within approximately 10 minutes of the seizure (and recognition not to rush into a cesarean section on an unstable patient). The actual simulation itself only takes approximately 5-7 minutes to complete; approximately 10-15 minutes are allowed for the debriefing and reviewing the best practices and safety points.

In an embodiment of the invention, initial treatment of eclampsia is aimed at stabilizing the mother and controlling the seizures. The definitive treatment for the underlying disease is the eventual delivery of the fetus. During the acute event, however, the mother takes precedence as the fetus does better when the mother is stabilized. A process for treating eclampsia includes calling for assistance (e.g., nursing staff, anesthesiologist, additional obstetricians, and/or pediatrician as delivery may be required after the seizure has been controlled). To protect the airway, the patient is rolled to her left side and a padded tongue blade is placed in the patient's mouth if possible. This helps prevent aspiration should the patient vomit while she cannot protect her airway. Medication is administered to control seizures, for example, magnesium sulfate and diazepam. Exemplary doses for magnesium sulfate are 2-4 grams IV push for 15 minutes to a maximum of 6 grams. Exemplary doses for diazepam are a 5 mg IV push, repeated as needed up to 20 mg total. This medication controls or breaks seizure activity in more than 80% of patients within 5 minutes (Delgado-Escueta, 1982)). To treat severe hypertension (i.e., >160/110) and to decrease the risk of intracerebral hemorrhage, the following exemplary medications and doses can be used to acutely decrease the patient's blood pressure. Hydralazine is administered for a 5 mg IV push, then 5-10 mg for 20 minutes as needed. 10-20 mg of labetalol is administered through an IV, then the dose is doubled every 10 minutes as needed up to an 80 mg dose with a total cumulative dose of 220 mg. After the eclamptic seizure has resolved, patients receive magnesium sulfate seizure prophylaxis (4-6 gram via IV over 15-20 minutes followed by 2 grams/hour for at least 24 hours).

The definitive treatment of the disease is delivery, but this does not necessarily mean a cesarean section must be performed immediately. Induction of labor is reasonable after the seizure has been controlled in the term or near-term fetus when the cervix is favorable, the fetus is in a vertex position, and any fetal distress has been resolved. The patient is monitored for development of complications. Complications to be monitored include, for example, disseminated intravascular coagulopathy with resulting hemorrhage, acute renal failure, pulmonary edema, intracerebral hemorrhage, cardiac arrest, liver rupture, and/or transient blindness (Lopez-Llera, 1992). Severe FHR decelerations of 3-5 minutes are commonly seen with eclamptic seizures. This degree of fetal distress does not prompt emergency delivery. The emphasis is on maternal stabilization, as outlined above, as the FHRT improves as the mother improves.

Neonatal Resuscitation Simulation

The following description provides a curriculum example for a neonatal resuscitation simulation. One of ordinary skill in the art will appreciate based on this disclosure that specific process steps are for illustration only, and that certain steps may be omitted. Many modifications and variations will be apparent to those of ordinary skill in the art without departing from the scope and spirit of the invention.

An exemplary clinical scenario for a neonatal resuscitation simulation involves calling providers to help resuscitate an infant that was born less than a minute ago via a vacuum delivery for fetal distress that was complicated by a shoulder dystocia that required delivery of the posterior arm to accomplish delivery. The infant is the product of a 26 year old G2P1001 at 38 and 5/7 weeks, GBS+. In an alternate clinical scenario, a 25 year old G3P2002 at 39+3 weeks is presented complaining of an urge to push. The provider is not given time to get her chart, but the patient says that her prenatal course was uncomplicated. The patient is taken quickly to a labor room and precipitously delivered. The staff in the room requests that someone come to help resuscitate the baby. If the neonatal resuscitation scenario is run in combination with a delivery scenario, then the clinical scenario from the other simulation is used.

Basic instructions are given to the participants (as described above). The simulators used for the neonatal resuscitation example include the NOELLE birthing mannequin and the resuscitation baby that comes with the mannequin although other simulators could be used. The resuscitation baby is also referred to as the PEDIBlue; this infant is slightly larger than the average newborn. For this simulation, the providers are reminded that: the baby can demonstrate central and peripheral cyanosis; the baby will not breathe spontaneously; and, the cyanosis will resolve when ventilations are done in the normal or high range within about 20 seconds (so the ventilations will have to be reset during the scenario). The providers are also reminded that the the PEDIBlue can be somewhat difficult to intubate because the airway is very anterior; the infant's heart rate will not be able to be controlled in the umbilical cord remnant with the red bulb; and, the PEDIBlue can monitor the force generated with both respirations and CPR (this is a potential grading factor).

In a neonatal resuscitation only simulation, the infant simulator is placed on an infant warmer in the delivery room and is left uncovered. The infant warmer is stocked with the usual instruments and medications used in a delivery/resuscitation. This does not need to be checked before the simulation. If the neonatal resuscitation is combined with another simulation, the PEDIBlue simulator is placed on the warmer with the head towards the end of the warmer (i.e., in the appropriate position) and covered with a towel. When the delivery is accomplished and the provider has the baby in their hands, the provider is directed to the warmer, the towel is removed, and the provider is allowed to start the neonatal resuscitation simulation.

Setting up of the PEDIBlue includes: plugging in the control box, keeping the tubes off to the side, and maintaining clear access to the red bulb in order to control the infant heart rate. In at least one embodiment, the control box settings for the neonatal resuscitation simulation are: status="one" and "test", condition="central", improvement="20", and deterioration="30". If running a combination scenario, other equipment includes a fetal monitoring system. Personnel utilized for the simulation includes staff to control the neonatal resuscitation mannequin (i.e., PEDIBlue). Staff member(s) could also be utilized as live actor(s) accompanying the patient to add realism and play the part of a family member to add stress/distraction/confusion in the simulation.

Tips to be given to the provider include: a reminder regarding the anteriorly positioned airway of the PEDIBlue, do not clamp the umbilical cord because it will not come off easily and will likely destroy the ability to create the infant's heart rate with the pressure bulb, and lubricate the infant with ultrasound gel to simulate that the infant has just delivered, and a reminder to clean and dry the infant. Additional tips include: place the infant on a wet towel (which also gives the providers a reminder to dry off the infant), use a smaller endotracheal (ET) tube (e.g., 2.5 mm) for the PEDIBlue neonate, and lubricate the ET tube in order to get it into the mannequin. The providers are also reminded that they will be physically controlling the infant's heart rate in the umbilical cord. As a point of reference for the person controlling the infant: for a heart rate less than 60 beats per minute (bpm), one squeeze every 1.5-2 seconds; heart rate greater than 60 but less than 100 bpm, one squeeze every 1 second; and, heart rate greater than 100 bpm, two squeezes every 1 second.

In an embodiment of the invention, a case flow for the neonatal resuscitation simulation includes setting up the PEDIBlue simulator (as described above), setting up the video camera, and briefing the initial provider on the clinical scenario. The initial provider enters room (if running a combined simulation, the delivery simulation is conducted first); and, the initial provider is told that "the infant is not breathing" (the infant has apnea and a HR less than 100 bpm). The participant performs bulb suction, dries and stimulates the infant, removes wet linens, and begins positive pressure ventilation with 100% oxygen. At approximately 30 seconds, the infant continues to be apneic and the HR is less than 60 bpm (regardless of interventions). The HR of less than 60 is continued and the team is allowed to perform interventions (e.g., chest compressions, intubation, and administration of medications). The providers' questions regarding the infant's breathing are answered (infant still has apnea); and, the umbilical pulse is checked for the actual heart rate. The cyanosis is continually reset approximately every 20 seconds by pressing the "Condition Button" three times to go back to "Central Cyanosis". The infant's heart rate is increased. The providers are informed that the infant is breathing well under the following conditions: it has been approximately 5 minutes since the resuscitation started; and, the team has intubated the infant and administered at least one correct dose/route of epinephrine (e.g., via ET tube dose is 0.3-1 ml/kg at 1:10,000 concentration). The team is informed that the scenario is over and the debrief is performed.

The team is not given any more history than what was offered before they entered into the room. Questions about the breathing are answered; and, the team is continually told that the infant has apnea. If the team tries to place an umbilical catheter, they are informed that this is not possible in this simulation.

After the scenario is over, the labeled clickers are handed out to the appropriate staff participants, the CPS system is opened, and the debrief is loaded for the appropriate scenario. The basic assumption is reviewed with the team; and, the teamwork debriefing is conducted. After the teamwork debriefing, critical actions for the simulation are reviewed with the team. The team members are asked for any lessons learned, which are recorded so they can be implemented on the labor and delivery ward if needed. The labor and delivery team is dismissed, the provider tasks and performance grading for the simulation scenario are opened and reviewed with all of the graders (e.g., 2 physicians and 2 nurses who observed the simulation). Both the teamwork debriefing and the provider tasks and performance grading are exported.

The following are potential factors to consider when scoring the providers on the neonatal resuscitation simulation: activating the radiant warmer, positioning the infant with the neck slightly extended, attempting to suction the mouth followed by the nose, drying the infant's body and head, stimulating the infant to breathe, removing wet linen from contact with the infant, and evaluating respirations, heart rate and color. Other potential scoring factors include: connecting the bag/mask to the oxygen source and selecting 5 L/min of 100% oxygen, providing supplemental oxygen, announcing the 1 minute APGAR (Appearance, Pulse, Grimace, Activity, Respiration) score, calling for help (e.g., neonatal intensive care (NICU), US Army Field Manuals staff (FM staff)), correctly positioning the mask on the infant, and beginning ventilations at the proper rate (e.g., 40-60 breaths/min) and pressure.

Additional scoring factors can include: initially assesses heart rate, breath sounds and chest movement, initially ventilating for approximately 30 seconds, reevaluating heart rate for approximately 6 seconds, beginning chest compressions for a heart rate less than 60 bpm, correctly performing two thumb or two finger chest compressions, proper cadence of chest compressions/ventilations (e.g., two compressions/second, ventilation after every third compression ("one-and-two-and-three-and-breathe-and-one-and-two . . . )), checking heart rate after approximately 30 seconds of compressions for approximately 6 seconds, correctly intubating patient within approximately 20 seconds of beginning attempt, confirming placement of the tube prior to continuing ventilation (e.g., auscultating, observing chest rise, ET tube vapor), securing ET tube properly, and considering placement of the umbilical vein catheter. Other potential scoring factors include: estimating the infant's weight prior to giving epinephrine, checking the dose and concentration of epinephrine before administration, giving epinephrine at the proper dose and concentration via the ET tube (e.g., via ET tube dose is approximately 0.3-1 ml/kg at approximately 1:10,000 concentration), correctly stating to cease chest compressions based on a heart rate less than 60 bpm, continuing to ventilate the infant at the proper rate until help arrives, and announcing the 5 minute APGAR score.

In at least one embodiment of the invention, potential teaching points and critical actions to discuss in debriefing include: the neonatal resuscitation program (NRP) algorithm including positive pressure ventilation, demonstration of proper performance of chest compressions and proper ratio of compressions/ventilations, review of epinephrine dosage, epinephrine concentration and routes of administration, and crisis resource management skills and TEAMSTEPPs. FIG. 8 illustrates sample TEAMSTEPPS debriefing questions according to an embodiment of the invention.

Other potential critical actions include: warming, positioning, drying and stimulating the infant, providing positive pressure ventilation for at least 30 seconds before proceeding to more advanced actions (e.g., chest compressions, intubation, line placement, medications), checking for heart rate at the umbilicus (for at least 6 seconds), using oxygen during the resuscitation (e.g., 5 L of 100% oxygen), and giving compressions once the heart rate is less than 60 bpm and positive pressure ventilation has not been successful. Additional critical actions can include: using the proper chest compression technique, using the proper ratio of chest compressions/ventilations (e.g., 3:1=90 compressions:30 ventilations per minute), intubating the infant at some point during the simulation, considering placement of an umbilical line, and giving the proper dose/concentration of epinephrine before the heart rate rises back above 60 bpm (e.g., 0.01-0.03 mg/kg of 1:10,000, use up to 0.1 mg/kg per ET).

In an embodiment of the invention, the actual simulation itself takes approximately 5-10 minutes to complete when factoring in the time for the providers to arrive and perform the NRP. The debriefing takes approximately 15 minutes followed by another 5-10 minutes to complete the CPS grading. The NRP Code for initial stabilization includes: A—Airway (position and clear), B—Breathing (stimulate to breath), and C—Circulation (assess heart rate and color) Temperature (warm and dry).

Operative Vaginal Delivery for Fetal Distress Simulation

The following description provides a curriculum example for an operative vaginal delivery simulation. One of ordinary skill in the art will appreciate based on this disclosure that specific process steps are for illustration only, and that certain steps may be omitted. Many modifications and variations will be apparent to those of ordinary skill in the art without departing from the scope and spirit of the invention.

An exemplary clinical scenario for an operative vaginal delivery for fetal distress simulation involves a 26 year old G2P1001 patient at 38+5 weeks gestational age (GA). Her obstetrical history is significant for one previous full-term spontaneous vaginal delivery (SVD) of a 7 lb male infant without noted complications. Her current pregnancy has not had any complications other than being diagnosed with Group B Strep approximately 3 weeks ago. She has no significant medical or surgical history. She was admitted in active labor and at last check, she was C/C/+1 station an hour ago. The FHRT had been reassuring, but decelerations have been occurring and the fetal heart has now been in the 80s for 3 minutes. An alternate clinical scenario involves a 41 year old G1P0 patient at 41+1 weeks GA. She is undergoing an induction of labor for mild preeclampsia and has had an otherwise uncomplicated prenatal course. She began pushing approximately 15 minutes ago. The provider is called to the room for a fetal heart rate deceleration that has been less than 90 bpm for nearly three minutes.

The simulator utilized for the operative vaginal delivery example is the NOELLE birthing mannequin with a vacuum delivery fetus although other simulators could be used. This fetus allows performance of either a vacuum or forceps delivery without changing. The vacuum fetus is placed into the abdomen of the birthing mannequin (the cervix does not have to be set in place). A fetal monitoring system is utilized to demonstrate a terminal bradycardia during the delivery. In order to do this, after starting up the software, the file "Operative Vaginal Delivery Terminal Bradycardia" or "Operative Vaginal Delivery Repetitive Decels" is loaded; and, the "Update" button is clicked for the fetal monitors. The difference between the two monitoring scenarios is the level of fetal distress. The terminal bradycardia scenario makes the team move more quickly, whereas the repetitive decels scenario gives the team more time to counsel the patient. A staff member is utilized to control the fetus and maternal mannequin. Staff member(s) could also be utilized as live actor(s) accompanying the patient to add realism and play the part of a family member to add stress/distraction/confusion in the simulation.

The providers may use a vacuum or forceps. Silicone spray lubricant is utilized due to a superior seal with the vacuum device. Alternatively, a small amount of sonogram gel is utilized. The provider is not permitted to actually perform an episiotomy; however, they are permitted to simulate one.

In an embodiment of the invention, a case flow for the operative vaginal delivery for fetal distress simulation includes setting up the NOELLE simulator, turning on the fetal monitors, loading the scenario, and clicking "Update". The initial provider is briefed on the clinical scenario. The providers enter the room and perform a cervical examination to recognize fetal distress. The providers counsel the patient on the indications/risks for an operative vaginal delivery. If they fail to do so, the providers are asked "is that dangerous?" The providers are allowed to perform an operative delivery. The fetus is pushed to make it deliver; and, the scenario is ended. The debrief is conducted; and, the technical aspects of the delivery are reviewed with the individual providers.

If the providers ask for help from pediatrics, they are told that they are on their way. The providers are not given any more history than what received before they walked into the room. After the scenario is over, the labeled clickers are handed out to the appropriate staff participants, the CPS system is opened, and the debrief is loaded for the appropriate scenario. The basic assumption is reviewed with the team; and, the teamwork debriefing is conducted. After the teamwork debriefing, critical actions for the simulation are reviewed with the team. The team members are asked for any lessons learned, which are recorded so they can be implemented on the labor and delivery ward if needed. The labor and delivery team is dismissed, the provider tasks and performance grading for the simulation scenario are opened and reviewed with all of the graders (e.g., 2 physicians and 2 nurses who observed the simulation). Both the teamwork debriefing and the provider tasks and performance grading are exported.

The following are potential factors to consider when scoring the providers on the operative vaginal delivery for fetal distress simulation: counseling the patient regarding vacuum delivery (without prompting), explaining the indication for the procedure, discussing potential complications (e.g., shoulder dystocia, postpartum hemorrhage, 3rd/4th degree lacerations, endometritis, scalp lacerations, cephalohematoma, retinal hemorrhages, and/or neonatal jaundice), asking the patient if they understand the counseling, and asking the patient if they have any questions. Other potential scoring factors include: offering a cesarean section as an alternative, calling for pediatrics, calling for anesthesia, assesses bony pelvis, determining the fetal head position, assessing the fetal station, ensuring adequate anesthesia, and estimating fetal weight.

Additional scoring factors can include: emptying the bladder, spreading the labia and inserting the vacuum device, placing the vacuum cup over the center of the sagittal suture, checking to ensure that no vaginal tissue is under the vacuum cup, asking for suction to be applied then rechecking application, asking for the appropriate level of pressure (e.g., approximately 600 mmHg), and applying axis traction in a direction perpendicular to the cup. Other potential scoring factors include: changing the direction of traction upwards as the head delivers, rechecking for vaginal tissue under the vacuum cup after reapplication if a pop-off occurs, releasing suction after the head is delivered, attempting to support the perineum during the delivery of the fetal head, and going to the operating room without considering an operative vaginal delivery in the delivery room.

Furthermore, the physician may be graded based on the following factors: reaction to the fetal distress in timely manner, performance of the vacuum delivery correctly, performance of the vacuum delivery safely, preparation for the vacuum delivery procedure, overall performance during the scenario, and overall counseling of the patient during the scenario.

If forceps are utilized, the providers are also graded based on their use. Potential grading factors include: counseling patient regarding forceps delivery (without prompting), offering a cesarean section as an alternative, explaining the indication for the procedure, discussing potential complications (e.g., shoulder dystocia, 3rd/4th degree lacerations, postpartum hemorrhage, endometritis, cephalohematoma, facial nerve injury, facial marks/lacerations, intracranial hemorrhage, and skull fractures). Other potential scoring factors include: asking the patient if they understand the counseling, asking the patient if they have any questions, calling for pediatrics and/or anesthesia, assessing bony pelvis, determining the fetal head position before placing the forceps, assessing the fetal station, ensuring adequate anesthesia, and estimating the fetal weight.

Additional scoring factors for the physicians can include: emptying of the bladder, inserting the posterior or maternal left blade first, holding the left forcep with the left hand while using the right hand as a guide without applying excessive force, carrying the left forcep through a sweeping arc across the perineum from above, and holding the right forcep with the right hand while the left hand is used as a guide without applying excessive force. Other potential scoring factors include: carrying the right forcep through a sweeping arc across the perineum from above, locking the blades, checking the sagittal suture to ensure that it is perpendicular to the plane of the shanks, checking the posterior fontanelles to ensure that it is one finger breadth away from the plane of the shanks, and checking to see if the head is equidistant from the sides of the blades. Other potential scoring factors for the physician include: ensuring that the fenestrations on each side will not admit more than one finger, unlocking and readjusting the forceps as necessary, applying traction with contractions, applying axis traction in the appropriate manner, changing the axis of traction upward as the head delivers, attempting to support the perineum, disengaging the forceps in the reverse order of application, and going to the operating room without considering an operative vaginal delivery in the delivery room. The physician's performance is also graded on the following potential factors: safety, preparation, technical performance, overall performance, and patient counseling.

In at least one embodiment, teaching points and critical actions to discuss in the debriefing include: understanding the indications and contraindications for an operative vaginal delivery, conducting an abbreviated counseling of the patient (even in an emergency), and proper technique in order to decrease the risk of complications. The actual simulation itself only takes approximately 5-7 minutes to complete. Debriefing takes approximately 10-15 minutes depending on the team's performance.

Postpartum Hemorrhage Simulation

The following description provides a curriculum example for a postpartum hemorrhage simulation. One of ordinary skill in the art will appreciate based on this disclosure that specific process steps are for illustration only, and that certain steps may be omitted. Many modifications and variations will be apparent to those of ordinary skill in the art without departing from the scope and spirit of the invention.

An exemplary clinical scenario for a postpartum hemorrhage simulation involves a 36 year old G3P2002 patient who had a precipitous delivery. The patient was presented in active labor and rapidly delivered a 4000 gram male infant. The placenta just delivered, but she is continuing to have some bleeding. Oxytocin is running in IV fluids. She does not have a chart available. In an alternate clinical scenario, a 21 year old G1P0 patient was delivered by forceps approximately 2 hours ago. She presented in spontaneous labor, but required pitocin augmentation for several hours prior to needing an operative vaginal delivery for fetal distress. She had a second degree laceration that was repaired, but she has soaked a whole pad in the last 15 minutes.

The simulator utilized for the postpartum hemorrhage example is the NOELLE birthing mannequin with the postpartum hemorrhage uterus insert although other simulators could be used. Other equipment includes a plastic placenta in the delivery basin on the floor or back table, an IV bag of fluid with the IV line taped to the patient's arm to simulate the first IV, and a postpartum hemorrhage insert placed into the NOELLE abdomen on top of the elevating pillow. This allows for it to be palpated abdominally and then snapped into the perineum. The perineum that is normally on the mannequin is removed by unsnapping it, in addition to the foam pad from the abdominal cover (in order to allow for the trainee to feel the uterus better). The fake blood reservoir is placed beside the mannequin's head and covered with a towel or sheet (the downstream tubing is clamped off). After filling up the reservoir, the hand pump is connected and the bag is pressurized. The uterus has a separate hand pump to control firmness. At the beginning of the scenario, the bag is boggy. At the end of the scenario, the bag is firm if the appropriate interventions are performed. A staff member is used to control hemorrhage and the maternal mannequin. Staff member(s) could also be utilized as live actor(s) accompanying the patient to add realism and play the part of a family member to add stress/distraction/confusion in the simulation.

The mannequin's upper torso is tilted up so that any fake blood that runs out of the cervix and does not come out the vagina does not collect in the maternal abdomen. A towel or absorbent pad is placed in the upper abdomen by the motor/eclampsia modification piece to ensure that fake blood does not get into the motor or other mechanical parts. The foam padding is removed from the abdominal cover in order to allow the providers to feel the boggy uterus better. If the provider tries to do a manual exploration of the uterus, they are informed that they will not be able to in the simulation, but that the exploration is normal. If the providers perform a visual inspection of the vagina and if they ask if there are cervical lacerations, they are informed that no lacerations exist. A small amount of fake blood is poured on the pads underneath the perineum.

In at least one embodiment, a case flow/algorithm for the postpartum hemorrhage simulation includes setting up the NOELLE simulator, turning the fetal monitors on, loading "Postpartum Hemorrhage Initial", and clicking "Update". The initial provider is briefed on the clinical scenario and they enter the room. The bleeding is started (the bag is filled with approximately 1 L of fake blood); and, the timer is started. The uterus is boggy and not fully inflated. At 30 seconds, "Postpartum Hemorrhage 30 SECONDS" is loaded and "Update" is clicked; at 60 Seconds, "Postpartum Hemorrhage 60 SECONDS" is loaded and "Update" is clicked; and, at 120 Seconds, "Postpartum Hemorrhage 120 SECONDS" is loaded and "Update" is clicked. The provider begins assessment and maneuvers. Exemplary maneuvers include: a fundal massage (the uterus remains boggy and bleeding continues), inspection of the cervix/vagina for lacerations, an attempt to manually clear the uterus, and medications (e.g., hemabate, methergine, cytotech). The uterus remains boggy unless the provider does the following: perform a fundal massage, assess the cervix for lacerations, and administers two different medications correctly (dose and route). If the medications are given incorrectly (either dose or route), the uterus does not become firm and the bleeding continues.

The scenario ends when any of the following occur: (1) a fundal massage, inspection for cervical lacerations, and two medications are given correctly, or (2) the blood runs out (takes approximately 5-7 minutes). At this point, the tube allowing the bleeding is clamped and the debriefing is conducted.

The providers may increase the pitocin rate if requested, but this does not have any effect on the scenario (there are approximately 20 units in the IV bag initially). There are no lacerations seen externally; the providers may inspect the placenta, which is on the back table. The placenta appears intact. If asked for vitals at times other than listed in the case flow, the vitals previously given are restated and/or the providers are pointed towards the fetal monitors. If asked by the providers, they are told that the estimated blood loss for the initial delivery is 500 cc; and, the patient's initial hematocrit was 30%. The provider is not allowed to insert a needle through the abdomen in order to administer medications directly to the uterus as this will puncture the inflatable uterus. All medication orders (dose and route) are clarified. The provider is not allowed to use notes.

After the scenario is over, the labeled clickers are handed out to the appropriate staff participants, the CPS system is opened, and the debrief is loaded for the appropriate scenario. The basic assumption is reviewed with the team; and, the teamwork debriefing is conducted. After the teamwork debriefing, critical actions for the simulation are reviewed with the team. The team members are asked for any lessons learned, which are recorded so they can be implemented on the labor and delivery ward if needed. The labor and delivery team is dismissed, the provider tasks and performance grading for the simulation scenario are opened and reviewed with all of the graders (e.g., 2 physicians and 2 nurses who observed the simulation). Both the teamwork debriefing and the provider tasks and performance grading are exported.

The following are potential factors to consider when scoring the providers on the postpartum hemorrhage simulation: recognizing postpartum hemorrhage, inspecting the placenta to ensure it appears intact, inspecting the vagina and cervix for lacerations, and recognizing that the bleeding is coming from the uterus. Other potential scoring factors include: performing a fundal massage, administering medication to correct atony (e.g., methergine with a correct dose of approximately 0.2 mg and a correct route of IM; hemabate with a correct dose of approximately 0.25 mg and a correct route of IM; cytotech (misprostol) with a correct dose of approximately 800-1000 ug with a correct route per rectum), correcting the hemorrhage prior to the blood running out, and the total amount of time required to correct the hemorrhage. The providers are also graded based on their recognition of postpartum hemorrhage in a timely manner, calling for medications in a timely fashion, overall performance, and preparedness.

In at least one embodiment, teaching points and critical actions to discuss in debriefing include: knowledge of the risk factors for postpartum hemorrhage, knowledge of the correct doses and routes of administration for the medications, ability to execute the critical actions as outlined in the scoring factors, and knowing the differential for postpartum hemorrhage. The actual simulation itself only takes approximately 5-7 minutes to complete. The debriefing takes approximately 10-15 minutes depending on the team's performance.

Shoulder Dystocia Simulation

The following description provides a curriculum example for a shoulder dystocia simulation. One of ordinary skill in the art will appreciate based on this disclosure that specific process steps are for illustration only, and that certain steps may be omitted. Many modifications and variations will be apparent to those of ordinary skill in the art without departing from the scope and spirit of the invention.

An exemplary clinical scenario for a shoulder dystocia simulation involves a 35 year old G2P1001 patient at 41+1 weeks gestation. Her prenatal course has been complicated by advanced maternal age (AMA) with a normal amniocentesis and a positive 1 hour glucola with a negative 3 hour glucose tolerance test (GTT). She was presented in active labor and was given an epidural for pain relief and progressed well. She was C/C/+1 at her last check and has been pushing for approximately 90 minutes with a reassuring fetal heart rate tracing. In an alternate scenario, a 21 year old G3P0020 patient is presented at 38+4 weeks gestation. Her prenatal course was complicated by maternal obesity (BMI=31). Her 1 hour glucola was normal and she was presented with spontaneous rupture of membranes (SROM) with clear fluid approximately 12 hours earlier and was noted to have irregular contractions. She was placed on oxytocin and has progressed to C/C/+2 and feels the urge to push. The fetal heart rate tracing has been reassuring.

The simulator utilized for the shoulder dystocia example is the NOELLE birthing mannequin with a fetus having a dystocia harness, although other simulators could be used. After the fetal head delivers, the providers keep the rest of the baby from delivering. The staff holds onto the baby/harness by placing their hand underneath the patient gown and the abdominal cover. Either the staff holds the fetus in by grasping the body or feet or by using a harness which is wrapped around the fetus. This harness is made of thin and strong material, i.e., a nylon strap or bungee cord. The posterior arm during the delivery is free to be delivered. Fetal heart rate monitors are used to demonstrate a terminal bradycardia during the delivery. In order to do this, after starting up the software, the file "Shoulder Dystocia" is loaded and the "Update" button for the fetal monitors is clicked. A staff member controls the fetus and maternal mannequin. Staff member(s) could also be utilized as live actor(s) accompanying the patient to add realism and play the part of a family member to add stress/distraction/confusion in the simulation.

A large amount of lubrication is used for the fetus, e.g., silicone lubricant, sonogram gel. The cervix is removed so that it does not hold up the fetus. The provider is told to only simulate an episiotomy if they feel that one is necessary and not to actually cut the mannequin. If a fetal heart rate monitor simulator is utilized, comments such as "the baby is very blue" and "why won't the baby come out" are made to the providers.

In at least one embodiment, the case flow/algorithm of the shoulder dystocia simulation includes setting up the NOELLE simulator, turning on the fetal monitors, loading the desired scenario, and clicking "Update". The initial provider is briefed on the clinical scenario. The provider enters room and is informed that the patient is having a contraction and she feels that she has to push. The fetal head is pushed until it delivers. The fetus restitutes such that one fetal shoulder is anterior. Traction is applied on the harness and the shoulders are not allowed to deliver. The timer is started to measure the head-to-body delivery interval. The providers recognize the shoulder dystocia and begin maneuvers. The maneuvers are responded to with feedback if the providers ask if the shoulder is delivering. If/when the provider delivers the posterior arm, the fetus is allowed to deliver. If the providers do not attempt to deliver the posterior arm, then the simulation proceeds until they do a Zavenelli maneuver or until they inform the graders that they do not know what else to do. After the scenario ends (either the posterior arm delivers, a Zavenelli maneuver is performed, or the provider gives up), the timer is stopped and the debriefing is conducted.

The providers are not given any more patient history than what received before they walked into the room. If the provider pulls hard on the infant, the staff maintains a tight grip on the cord. If the anterior fetal shoulder appears during delivering, the staff pulls the infant back further into the pelvis.

After the scenario is over, the labeled clickers are handed out to the appropriate staff participants, the CPS system is opened, and the debrief is loaded for the appropriate scenario. The basic assumption is reviewed with the team; and, the teamwork debriefing is conducted. After the teamwork debriefing, critical actions for the simulation are reviewed with the team. The team members are asked for any lessons learned, which are recorded so they can be implemented on the labor and delivery ward if needed. The labor and delivery team is dismissed, the provider tasks and performance grading for the simulation scenario are opened and reviewed with all of the graders (e.g., 2 physicians and 2 nurses who observed the simulation). Both the teamwork debriefing and the provider tasks and performance grading are exported.

The following are potential factors to consider when scoring the providers on the shoulder dystocia simulation: recognizing the shoulder dystocia, calling for additional help (e.g., nurse, physician, and/or pediatrics), applying gentle traction to attempt delivery, performing a McRobert's maneuver, and utilizing suprapubic pressure. Other potential scoring factors include: attempting an oblique maneuver (e.g., Woodscrew or Rubin), episiotomy, attempting to deliver the posterior arm, draining the bladder, attempting to fracture the clavicle, symphisiotomy, performing a Zavenelli maneuver, collecting cord blood for gases, and the actual head-to-body delivery time. The provider is also graded based on: performance of maneuvers in a timely fashion, performance of most maneuvers correctly, overall performance, and preparedness.

In at least one embodiment, teaching points and critical actions to discuss in debriefing include: anticipating shoulder dystocia, understanding and verbalizing risk factors for shoulder dystocia, executing the critical actions as outlined in the scoring factors, and knowing the list of possible maneuvers. The actual simulation itself only takes approximately 5-7 minutes to complete. The debrief takes approximately 10-15 minutes depending on the team's performance.

Accordingly, an embodiment of the invention provides an obstetrics simulation system, comprising an articulating maternal birthing simulator. The maternal birthing simulator is a full size and full-body female having an intubeable airway with a chest rise component, a forearm having a medication receiving component, and/or a fetal heart sound component. In an alternative embodiment, the maternal birthing simulator lacks limbs (i.e., arms and legs). Additionally, the maternal birthing simulator includes a head descent and cervical dilation monitor, a placenta positionable in at least two locations, two or more removable dilating cervices, and/or postpartum vulval suturing inserts.

As illustrated in FIGS. 9A and 9B, an eclampsia simulation component 910 is provided in a cavity 920 of the maternal birthing simulator 930, wherein the eclampsia simulation component 910 has a motor 940, a drive shaft 950 connected to the motor 940, and a cam 960 connected to the drive shaft 950. FIG. 9B illustrates a side view and FIG. 9C illustrates a top view of the eclampsia simulation component 910. The cam 960 engages and agitates an aperture 970 within the cavity 920. The center of the cam 960 is offset with respect to a center of the aperture 970. Specifically, as illustrated in FIG. 9B, rotation of the drive shaft 950 and the resulting movement of the cam 960 moves the cavity 920 to shake the maternal birthing simulator 930 all around.

At least one processor is provided for receiving input from the maternal birthing simulator, generating feedback based on the input, and sending the feedback to the maternal birthing simulator. The obstetrics simulation system further includes: a medical information (e.g., heart rate, temperature) display connected to the maternal birthing simulator, a video recording and playback system connected to the processor, and/or an audio system connected to the maternal birthing simulator.

Moreover, a grading component is connected to the processor. As discussed more fully above, the CPS debriefing/grading system has individual keypads (IR system), labeled keypads, and on-screen anonymity. FIGS. 6A and 6B illustrate an example of on-screen anonymity. Each grader (e.g., Physician 1, Physician 2, Nurse 1, Nurse 2) inputs scores into the system. For example, a scoring factor for the eclamptic seizure simulation is whether the provider recognizes the situation as an eclamptic seizure (FIG. 6A; A=Yes, B=No).

After all of the graders have input their scores, the combined scores are displayed, wherein the graders remain anonymous (FIG. 6B; five graders scored a "Yes", three graders scored a "No"). As illustrated in FIG. 6C, reports can be produced in order to view the scoring input by graders for a specific scoring factor (e.g., "Calls for additional help").

At least one embodiment of the invention provides a method, including assembly of a simulation system having a simulator, a processor, and at least one display. The simulation system is provided along with documentation to a plurality of medical facilities within a system. Training on the use of the simulator, different simulations, and criteria for grading the performance on any given simulation is also provided. The training includes team training for conducting simulations using the simulation system. The simulations include breech vaginal delivery, umbilical cord prolapsed, eclampsia, neonatal resuscitation, operative vaginal delivery, postpartum hemorrhage, and/or shoulder dystocia.

Figure 10:
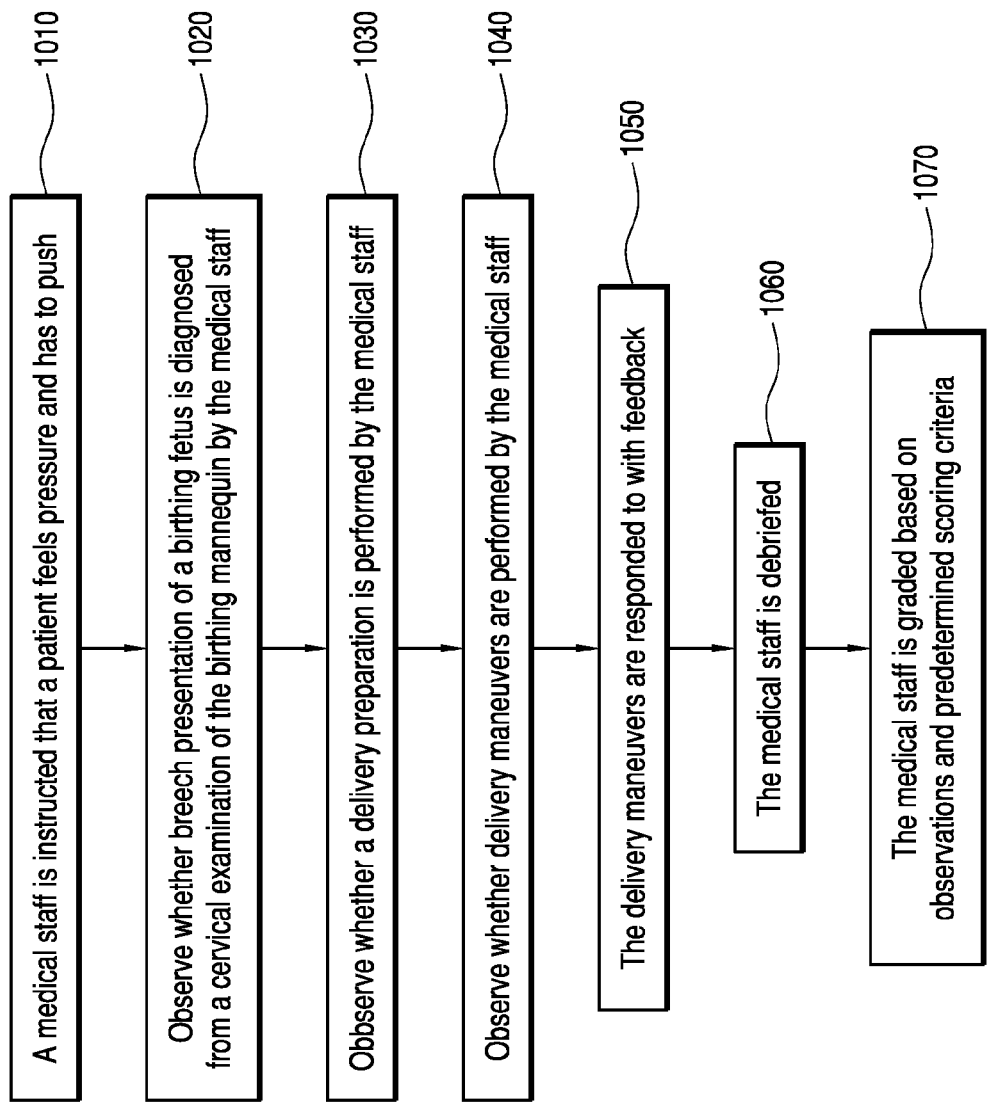
FIG. 10 is a flow diagram illustrating a breech vaginal delivery simulation.

More specifically, the breech vaginal delivery simulation assembles the birthing mannequin and the birthing fetus in a breech position. As illustrated in FIG. 10, a medical staff is instructed that a patient feels pressure and has to push, wherein the patient is a birthing mannequin (item 1010). The simulation observes whether of breech presentation of a birthing fetus is diagnosed from a cervical examination of the birthing mannequin by the medical staff (item 1020). It is further observed whether a delivery preparation is performed by the medical staff, wherein the delivery preparation includes pushing the head of the birthing fetus until a buttocks of the birthing fetus begins to deliver in a sacrum anterior position (item 1030). The simulation observes whether delivery maneuvers are performed by the medical staff (item 1040). The delivery maneuvers are responded to with feedback during the simulation (item 1050). The medical staff is debriefed (item 1060) and graded based on observations and predetermined scoring criteria (item 1070).

Figure 11:
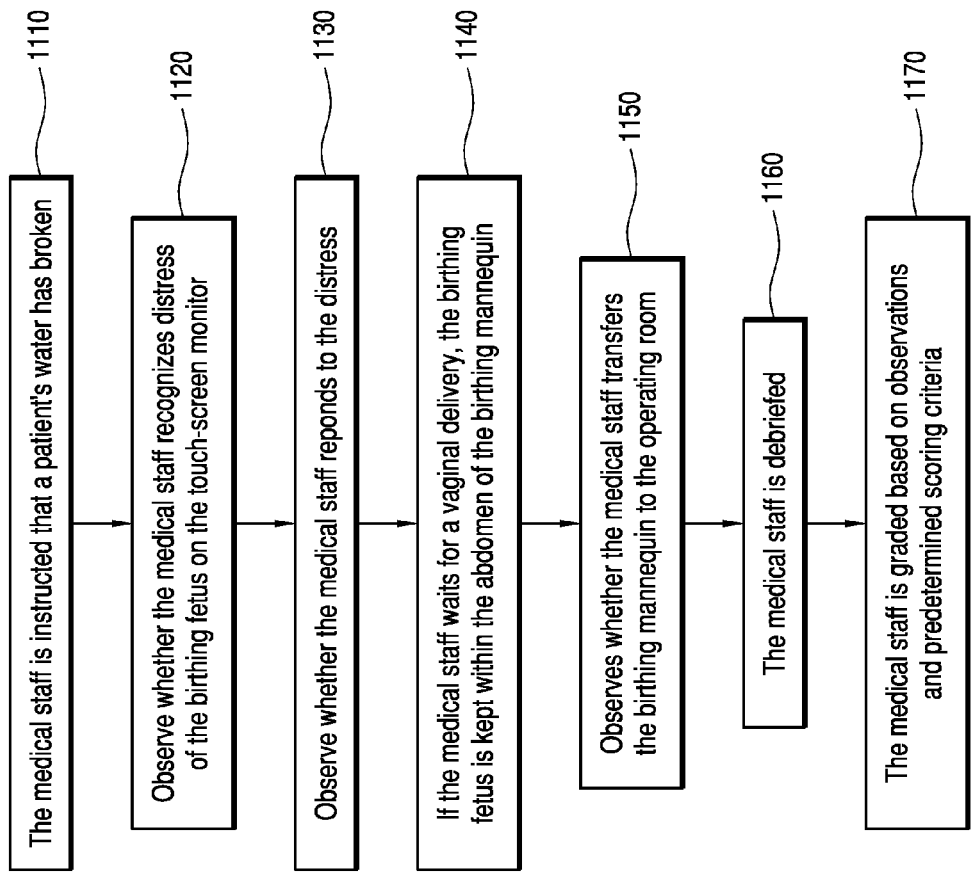
FIG. 11 is a flow diagram illustrating an umbilical cord prolapse simulation.

The umbilical cord prolapse simulation assembles the birthing mannequin and a mobile cart having a touch-screen monitor. As illustrated in FIG. 11, the medical staff is instructed that a patient's water has broken, wherein the patient is the birthing mannequin (item 1110). The simulation observes whether the medical staff recognizes distress of the birthing fetus on the touch-screen monitor (item 1120) and observes whether the medical staff responds to the distress (item 1130). If the medical staff waits for a vaginal delivery, the birthing fetus is kept within the abdomen of the birthing mannequin (item 1140). The simulation observes whether the medical staff transfers the birthing mannequin to the operating room (item 1150). The medical staff is debriefed (item 1160) and graded based on observations and predetermined scoring criteria (item 1170).

Figure 12:
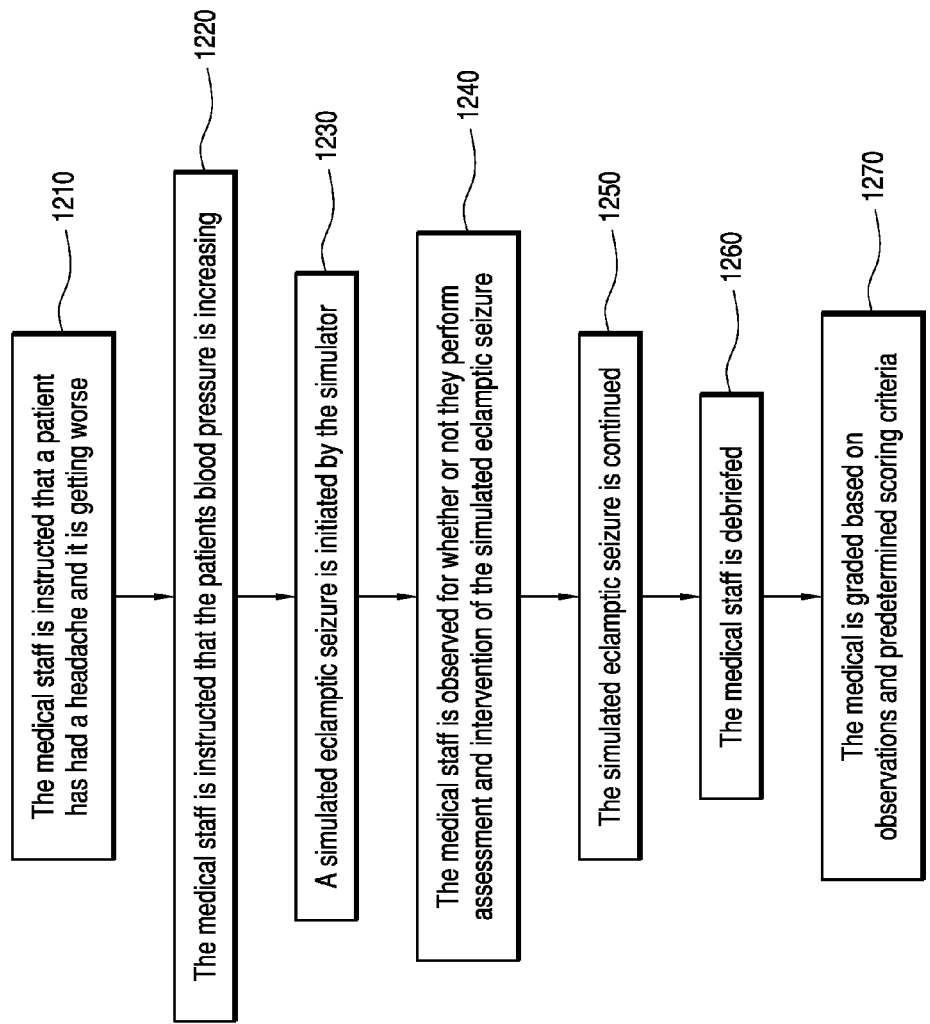
FIG. 12 is a flow diagram illustrating an eclampsia simulation.

The eclampsia simulation assembles the birthing mannequin and mobile cart with at least one touch-screen monitor. The birthing mannequin has a means for shaking to simulate a generalized seizure (e.g., the eclampsia simulation component). As illustrated in FIG. 12, the medical staff is instructed that a patient has had a headache and it is getting worse, wherein the patient is the birthing mannequin (item 1210). Moreover, the medical staff is instructed that the patient's blood pressure is increasing (item 1220). A simulated eclamptic seizure is initiated by the simulator (item 1230); and, the medical staff is observed for whether or not they perform assessment and intervention of the simulated eclamptic seizure (item 1240). The intervention includes administrating medications and/or rolling the patient. The simulated eclamptic seizure is continued (item 1250). The medical staff is debriefed (item 1260) and graded based on observations and predetermined scoring criteria (item 1270).

Figure 13:
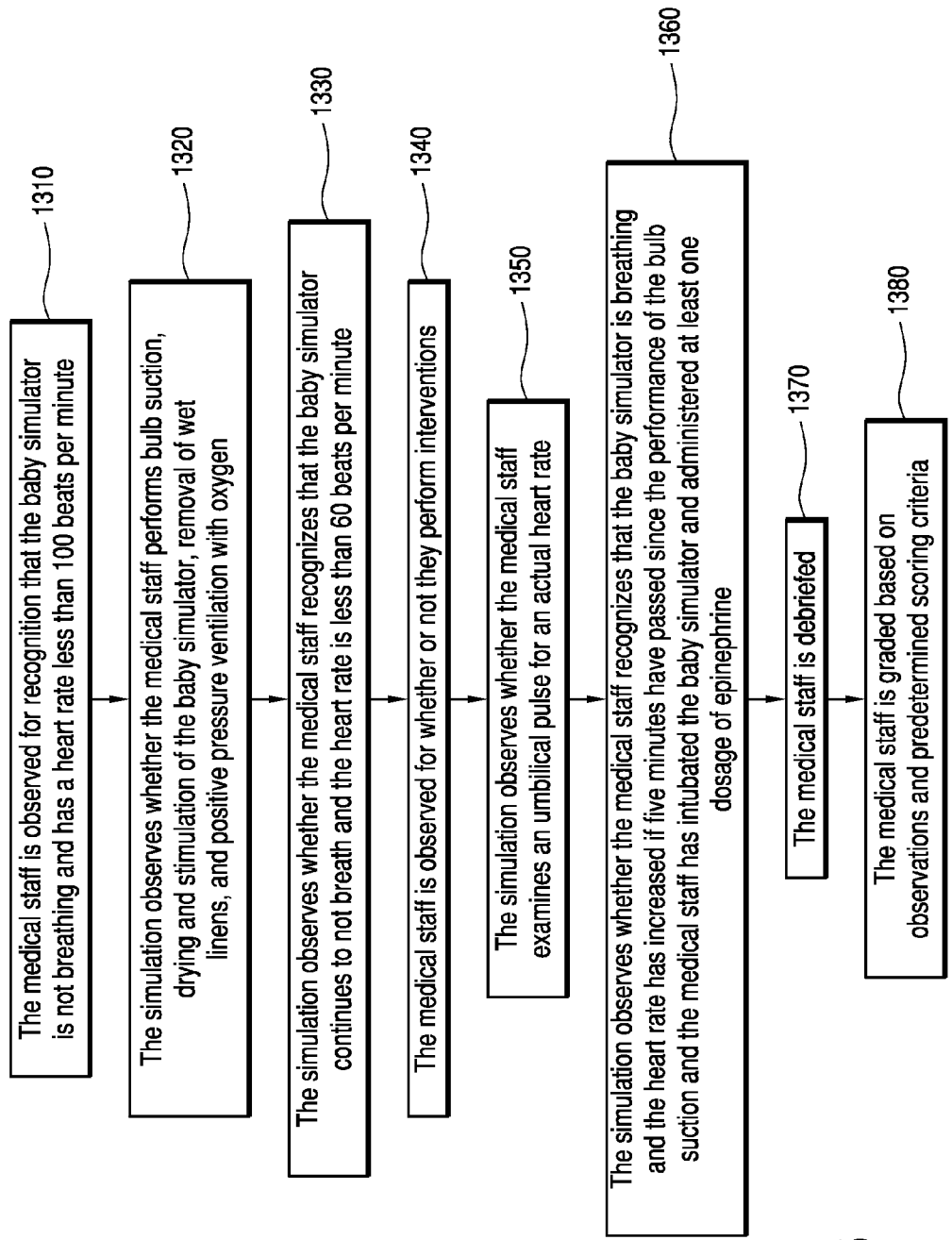
FIG. 13 is a flow diagram illustrating a neonatal resuscitation simulation.

The neonatal resuscitation simulation assembles the birthing mannequin and the baby simulator. As illustrated in FIG. 13, the medical staff is observed for recognition that the baby simulator is not breathing and has a heart rate less than 100 beats per minute (item 1310). The simulation observes: whether the medical staff performs bulb suction, drying and stimulation of the baby simulator, removal of wet linens, and positive pressure ventilation with oxygen (item 1320), and whether the medical staff recognizes that the baby simulator continues to not breath and the heart rate is less than 60 beats per minute (item 1330). Moreover, the medical staff is observed for whether or not they perform interventions, such as, for example, chest compressions, intubation, and/or administration of medications (item 1340). The simulation also observes: whether the medical staff examines an umbilical pulse for an actual heart rate (item 1350), and whether the medical staff recognizes that the baby simulator is breathing and the heart rate has increased if five minutes have passed since the performance of the bulb suction and the medical staff has intubated the baby simulator and administered at least one dosage of epinephrine (item 1360). The medical staff is debriefed (item 1370) and graded based on observations and predetermined scoring criteria (item 1380).

Figure 14:
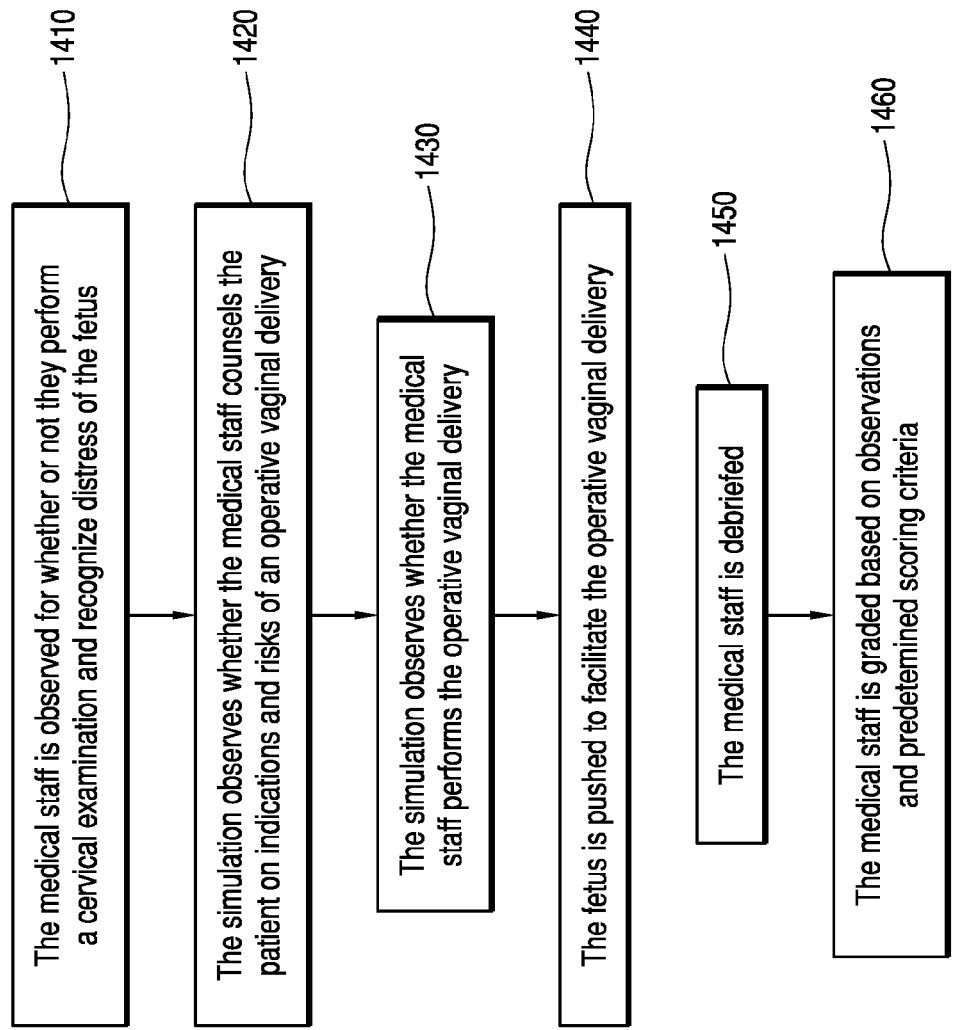
FIG. 14 is a flow diagram illustrating an operative vaginal delivery simulation.

The operative vaginal delivery simulation assembles the birthing mannequin, the mobile cart with at least one touch-screen monitor, and a vacuum delivery fetus, which allows a vacuum delivery or a forceps delivery. As illustrated in FIG. 14, the medical staff is observed for whether or not they perform a cervical examination and recognize distress of the fetus (item 1410). The simulation also observes: whether the medical staff counsels the patient on indications and risks of an operative vaginal delivery (item 1420) and whether the medical staff performs the operative vaginal delivery (item 1430). The fetus is pushed to facilitate the operative vaginal delivery (item 1440). The medical staff is debriefed (item 1450) and graded based on observations and predetermined scoring criteria (item 1460).

Figure 15:
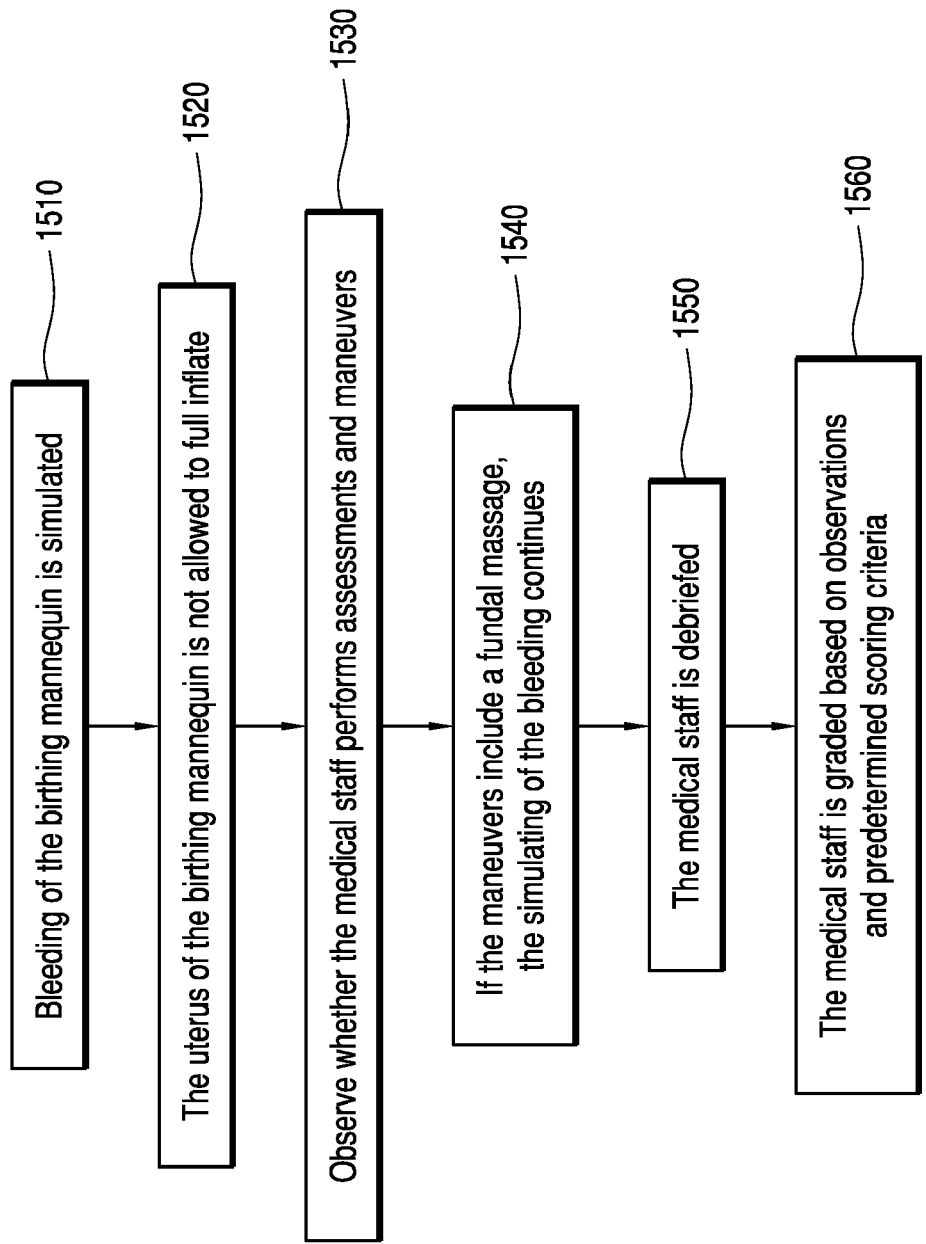
FIG. 15 is a flow diagram illustrating a postpartum hemorrhage simulation.

The postpartum hemorrhage simulation assembles the birthing mannequin with a postpartum hemorrhage uterus insert, and the mobile cart with at least one touch-screen monitor. As illustrated in FIG. 15, bleeding of the birthing mannequin is simulated (item 1510); and, the uterus of the birthing mannequin is not allowed to fully inflate (item 1520). The simulation observes whether the medical staff performs assessments and maneuvers (item 1530). The maneuvers include a fundal massage, inspection of the cervix and/or vagina for lacerations, manual clearing of the uterus, and/or administration of medications. If the maneuvers include the fundal massage, the simulating of the bleeding continues (item 1540). The medical staff is debriefed (item 1550) and graded based on observations and predetermined scoring criteria (item 1560).

Figure 16:
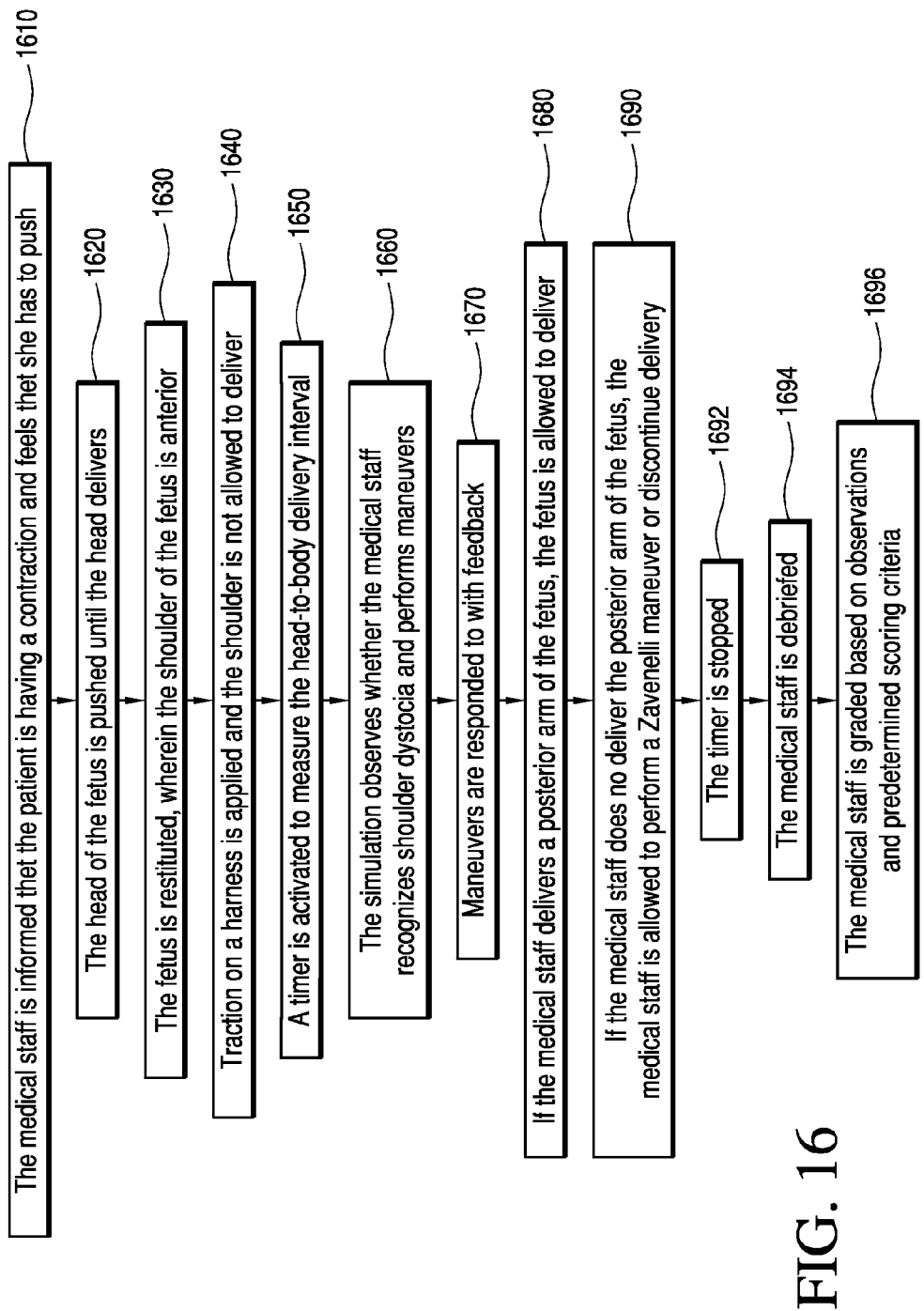
FIG. 16 is a flow diagram illustrating a shoulder dystocia simulation.

The shoulder dystocia simulation assembles the birthing mannequin and mobile cart with at least one touch-screen monitor. As illustrated in FIG. 16, the medical staff is informed that the patient is having a contraction and feels that she has to push, wherein the patient is the birthing mannequin (item 1610). The head of the fetus is pushed until the head delivers (item 1620); and, the fetus is restituted, wherein the shoulder of the fetus is anterior (item 1630). Traction on a harness is applied and the shoulder is not allowed to deliver (item 1640). A timer is activated to measure the head-to-body delivery interval (item 1650). The simulation observes whether the medical staff recognizes shoulder dystocia and performs maneuvers (item 1660). Maneuvers are responded to with feedback (item 1670). If the medical staff delivers a posterior arm of the fetus, the fetus is allowed to deliver (item 1680). If the medical staff does not deliver the posterior arm of the fetus, the medical staff is allowed to perform a Zavenelli maneuver or discontinue delivery (item 1690). The timer is stopped (item 1692); and, the medical staff is debriefed (item 1694) and graded based on observations and predetermined scoring criteria (item 1696). Specifically, the grading of the medical staff is based on at least five of the following factors: recognition of shoulder dystocia, calling for help from at least one of a nurse, a physician, and pediatrics, applying gentle traction to attempt delivery, performing a McRobert's maneuver, utilizing suprapubic pressure, attempting an oblique maneuver, episiotomy, attempting to deliver a posterior arm, draining a bladder, attempting to fracture a clavicle, symphisiotomy, performing a Zavenelli maneuver, collecting cord blood for gases, actual head-to-body delivery time, performance of maneuvers in a timely fashion, performance of maneuvers correctly, overall performance, and preparedness.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method, comprising:
    assembling a simulation system having a simulator, a processor, and at least one display, said simulator comprising a birthing mannequin with a fetus and an eclampsia simulation component in a cavity of the birthing mannequin, the eclampsia simulation component comprising: a motor, a drive shaft connected to the motor, a cam connected to the drive shaft, wherein the cam engages and agitates an aperture within the cavity, and wherein a center of the cam is offset with respect to a center of the aperture; providing said simulation system along with documentation to a plurality of medical facilities; and providing training on use of said simulator, different simulations, and criteria for grading performance on said simulations, said training including team training for conducting said simulations using said simulation system, and said simulations including an eclampsia simulation comprising: instructing a medical staff that a patient has had a headache and is getting worse, wherein the patient is the birthing mannequin, instructing the medical staff that the patient's blood pressure is increasing; initiating a simulated eclamptic seizure by activating the motor of the simulator to rotate the drive shaft and the cam, observing whether said medical staff performs assessment and intervention of said simulated eclamptic seizure, wherein said intervention includes at least one of administrating medications and rolling of said patient, and continuing said simulated eclamptic seizure.

2. The method according to claim 1,
    wherein said eclampsia simulation further comprises: debriefing said medical staff; and grading said medical staff based on observations and predetermined scoring criteria.

3. The method according to claim 1, wherein said assembling comprises assembling a birthing mannequin and a mobile cart comprising at least one touch-screen monitor, wherein said birthing mannequin comprises a means for shaking to simulate a generalized seizure.

4. The method according to claim 1, further comprising a simulated shoulder dystocia including:
    informing a medical staff that a patient is having a contraction and feels that she has to push, wherein said patient comprises said birthing mannequin;
    pushing a head of said fetus until said head delivers;
    restituting said fetus, wherein said shoulder of said fetus is anterior;
    activating a timer to measure a head-to-body delivery interval;
    observing whether said medical staff recognizes shoulder dystocia and performs maneuvers;
    responding to said maneuvers with feedback;
    if said medical staff delivers a posterior arm of said fetus, allowing said fetus to deliver;
    if said medical staff does not deliver said posterior arm of said fetus, allowing said medical staff to one of perform a Zavenelli maneuver and discontinue delivery;
    stopping said timer;
    debriefing said medical staff; and
    grading said medical staff based on observations and predetermined scoring criteria.

5. The method according to claim 1, further comprising a breech vaginal delivery simulation comprising:
    instructing a medical staff that a patient feels pressure and has to push, wherein said patient comprises a birthing mannequin;
    observing whether of a breech presentation of a birthing fetus is diagnosed from a cervical examination of said birthing mannequin by said medical staff;
    observing whether a delivery preparation is performed by said medical staff, wherein said delivery preparation comprises pushing a head of said birthing fetus until a buttocks of said birthing fetus begins to deliver in a sacrum anterior position;
    observing whether delivery maneuvers are performed by said medical staff;
    responding to said delivery maneuvers with feedback during said simulation;
    debriefing said medical staff; and
    grading said medical staff based on observations and predetermined scoring criteria.

6. A method for simulating a medical procedure, comprising:
    assembling a simulation system comprising a birthing mannequin, a birthing fetus,
    a processor, at least one display, and an eclampsia simulation component in a cavity of said birthing mannequin, the eclampsia simulation component comprising: a motor, a drive shaft connected to the motor, a cam connected to the drive shaft, wherein the cam engages and agitates an aperture within the cavity, and wherein a center of the cam is offset with respect to a center of the aperture; providing a medical staff with a pre-simulation clinical scenario, said providing of the medical staff with said pre-simulation clinical scenario by instructing the medical staff that a patient has had a headache and is getting worse and that the patient's blood pressure is increasing, wherein the patient is the birthing mannequin; beginning a simulated eclampsia medical procedure, comprising activating the motor of the simulator to rotate the drive shaft and the cam, said simulated medical procedure includes an eclampsia simulation;
observing behavior of the medical staff;
reacting to said behavior with feedback from said simulation system;
observing a response to said feedback from said medical staff;
ending said simulated medical procedure; and
debriefing and grading said medical staff based on said behavior, said response, and predetermined scoring criteria using the processor.

7. The method according to claim 6, further comprising a breech vaginal delivery including providing the medical staff with said pre-simulation clinical scenario comprises instructing said medical staff that a patient feels pressure and has to push, wherein said patient comprises said birthing mannequin,
observing whether of a breech presentation of said birthing fetus is diagnosed from a cervical examination of said birthing mannequin by said medical staff,
observing whether a delivery preparation is performed by said medical staff, wherein said delivery preparation comprises pushing a head of said birthing fetus until a buttocks of said birthing fetus begins to deliver in a sacrum anterior position, and
observing whether delivery maneuvers are performed by said medical staff.

8. The method according to claim 6, further comprising a simulated umbilical cord prolapsed including providing the medical staff with said pre-simulation clinical scenario comprises instructing said medical staff that a patient's water has broken, wherein said patient comprises said birthing mannequin
observing whether said medical staff recognizes distress of said birthing fetus on said display, observing whether said medical staff responds to said distress, and
observing whether said medical staff transfers said birthing mannequin to an operating room when said birthing fetus remains within an abdomen of said birthing mannequin.

9. The method according to claim 6, wherein
said providing of said medical staff with said pre-simulation clinical scenario comprises instructing said medical staff that a patient has had a headache and is getting worse and that said patient's blood pressure is increasing, wherein said patient comprises said birthing mannequin, and
wherein said observing of said behavior comprises observing whether said medical staff performs assessment and intervention of a simulated eclamptic seizure, said intervention comprising at least one of administrating medications and rolling of said patient.

10. The method according to claim 6, further comprising a simulated neonatal resuscitation including:
observing whether said medical staff recognizes that a baby simulator of said simulation system is not breathing and has a heart rate less than 100 beats per minute;
observing whether said medical staff performs bulb suction, drying and stimulation of said baby simulator, removal of wet linens, and positive pressure ventilation with oxygen,
observing whether said medical staff recognizes that said baby simulator continues to not breath and said heart rate is less than 60 beats per minute,
observing whether said medical staff performs interventions, said interventions comprising at least one of chest compressions, intubation, and administration of medications,
observing whether said medical staff examines an umbilical pulse for an actual heart rate, and
observing whether said medical staff recognizes that said baby simulator is breathing and said heart rate has increased if five minutes have passed since said performance of said bulb suction and said medical staff has intubated said baby simulator and administered at least one dosage of epinephrine.

11. The method according to claim 6, further comprising a simulated operative vaginal delivery including:
observing whether said medical staff performs a cervical examination and recognizes distress of said birthing fetus,
observing whether said medical staff counsels a patient on indications and risks of an operative vaginal delivery, and
observing whether said medical staff performs said operative vaginal delivery.

12. The method according to claim 6, further comprising a simulated postpartum hemorrhage simulation, including observing whether said medical staff performs assessments and maneuvers, said maneuvers comprising at least one of a fundal massage, inspection of at least one of a cervix and vagina for lacerations, manual clearing of said uterus, and administration of medications.

13. The method according to claim 6, The method according to claim 6, further comprising a simulated shoulder dystocia including: wherein said providing of said medical staff with said pre-simulation clinical scenario comprises instructing said medical staff that a patient is having a contraction and feels that she has to push, wherein said patient comprises said birthing mannequin, wherein said observing of said behavior comprises observing whether said medical staff recognizes shoulder dystocia and performs maneuvers, and wherein said shoulder dystocia simulation includes applying traction on a harness and disallowing a shoulder of the birthing fetus to deliver.

14. The method according to claim 6, wherein said grading of said medical staff comprises grading based on at least five of the following factors: recognition of shoulder dystocia, calling for help from at least one of a nurse, a physician, and pediatrics, applying gentle traction to attempt delivery, performing a McRobert's maneuver, utilizing suprapubic pressure, attempting an oblique maneuver, episiotomy, attempting to deliver a posterior arm, draining a bladder, attempting to fracture a clavicle, symphisiotomy, performing a Zavenelli maneuver, collecting cord blood for gases, actual head-to-body delivery time, performance of maneuvers in a timely fashion, performance of maneuvers correctly, overall performance, and preparedness.

15. A method comprising: assembling a simulation system having a birthing mannequin, a mobile cart, a processor, at least one touch-screen monitor, said birthing mannequin having a means for shaking to simulate a generalized seizure including a motor, a drive shaft connected to the motor, and a cam connected to the drive shaft, wherein the cam engages and agitates an aperture within the cavity, and wherein a center of the cam is offset with respect to a center of the aperture; providing said simulation system along with documentation to a plurality of medical facilities within a system; and providing training on use of said simulation system, different simulations, and criteria for grading performance on said simulations, said training including team training for conducting said simulations using said simulation system, said simulations comprising an eclampsia simulation including: instructing a medical staff that a patient has had a headache and is getting worse, wherein said patient comprises a birthing mannequin, instructing said medical staff that said patient's blood pressure is increasing; initiating a simulated eclamptic seizure with the means for shaking, observing whether said medical staff performs assessment and intervention of said simulated eclamptic seizure, said intervention comprising at least one of administrating medications and rolling of said patient, and continuing said simulated eclamptic seizure.

16. The method according to claim 15, wherein said simulations further include a breech vaginal delivery simulation comprising:
   instructing a medical staff that a patient feels pressure and has to push, wherein said patient comprises said birthing mannequin;
   observing whether of a breech presentation of a birthing fetus is diagnosed from a cervical examination of said birthing mannequin by said medical staff;
   observing whether a delivery preparation is performed by said medical staff, wherein said delivery preparation comprises pushing a head of said birthing fetus until a buttocks of said birthing fetus begins to deliver in a sacrum anterior position;
   observing whether delivery maneuvers are performed by said medical staff;
   responding to said delivery maneuvers with feedback during said simulation;
   debriefing said medical staff; and
   grading said medical staff based on observations and predetermined scoring criteria.

17. The method according to claim 15, wherein said simulations further include an umbilical cord prolapse simulation comprising:
   instructing a medical staff that a patient's water has broken, wherein said patient comprises a birthing mannequin;
   observing whether said medical staff recognizes distress of a birthing fetus on a touch-screen monitor;
   observing whether said medical staff responds to said distress;
   if said medical staff waits for a vaginal delivery, keeping said birthing fetus within an abdomen of said birthing mannequin;
   observing whether said medical staff transfers said birthing mannequin to an operating room;
   debriefing said medical staff; and
   grading said medical staff based on observations and predetermined scoring criteria.

18. The method according to claim 15, wherein said simulations further include an operative vaginal delivery simulation comprising:
   observing whether a medical staff performs a cervical examination and recognizes distress of a fetus;
   observing whether said medical staff counsels a patient on indications and risks of an operative vaginal delivery;
   observing whether said medical staff performs said operative vaginal delivery;
   pushing said fetus to facilitate said operative vaginal delivery;
   debriefing said medical staff; and
   grading said medical staff based on observations and predetermined scoring criteria.

19. The method according to claim 15, wherein said simulations further include a postpartum hemorrhage simulation comprising:
   simulating bleeding of said birthing mannequin;
   allowing a uterus of said birthing mannequin to not fully inflate;
   observing whether a medical staff performs assessments and maneuvers, said maneuvers comprising at least one of a fundal massage, inspection of at least one of a cervix and vagina for lacerations, manual clearing of said uterus, and administration of medications;
   if said maneuvers comprise said fundal massage, continuing of said simulating of said bleeding;
   debriefing said medical staff; and
   grading said medical staff based on observations and predetermined scoring criteria.

20. The method according to claim 15, wherein said simulations further include a shoulder dystocia simulation comprising:
   informing a medical staff that a patient is having a contraction and feels that she has to push, wherein said patient comprises said birthing mannequin;
   pushing a head of a fetus until said head delivers;
   restituting said fetus, wherein a shoulder of said fetus is anterior; applying traction on a harness and disallowing said shoulder to deliver; activating
   a timer to measure a head-to-body delivery interval;
   observing whether said medical staff recognizes shoulder dystocia and performs maneuvers;
   responding to said maneuvers with feedback;
   if said medical staff delivers a posterior arm of said fetus, allowing said fetus to deliver;
   if said medical staff does not deliver said posterior arm of said fetus, allowing said medical staff to one of perform a Zavenelli maneuver and discontinue delivery;
   stopping said timer;
   debriefing said medical staff; and
   grading said medical staff based on observations and predetermined scoring criteria.

* * * * *